US010417751B2

(12) United States Patent
Hattori et al.

(10) Patent No.: US 10,417,751 B2
(45) Date of Patent: Sep. 17, 2019

(54) IMAGE PROCESSING APPARATUS, WARNING APPARATUS, IMAGE PROCESSING SYSTEM, AND IMAGE PROCESSING METHOD

(71) Applicant: Hitachi, Ltd., Tokyo (JP)

(72) Inventors: Hideharu Hattori, Tokyo (JP); Yoshifumi Izumi, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 15/790,199

(22) Filed: Oct. 23, 2017

(65) Prior Publication Data

US 2018/0114299 A1    Apr. 26, 2018

(30) Foreign Application Priority Data

Oct. 24, 2016 (JP) .................. 2016-208026

(51) Int. Cl.
G06T 5/00 (2006.01)
G06T 7/90 (2017.01)
(Continued)

(52) U.S. Cl.
CPC .......... *G06T 5/008* (2013.01); *G06K 9/00798* (2013.01); *G06K 9/00818* (2013.01); *G06T 5/40* (2013.01); *G06T 7/90* (2017.01); *G08G 1/04* (2013.01); *G08G 1/0967* (2013.01); *G08G 1/0969* (2013.01); *H04N 5/23293* (2013.01);
(Continued)

(58) Field of Classification Search
None
See application file for complete search history.

(56) References Cited

U.S. PATENT DOCUMENTS

2009/0128626 A1* 5/2009 Miyakoshi ............... B60R 1/00
                                                          348/118
2015/0278615 A1* 10/2015 Ogawa ............... G06K 9/00818
                                                          348/148
2016/0150070 A1* 5/2016 Goren ................. H04W 4/029
                                                          455/404.2

FOREIGN PATENT DOCUMENTS

JP         2008-139320 A       6/2008

OTHER PUBLICATIONS

Hazelhoff, L., et al., "Combined generation of road marking and road sign databases applied to consistency checking of pedestrian crossings", 14th IAPR International Conference on Machine Vision Applications (MVA), pp. 439-442, (2015) (Year: 2015).*

(Continued)

*Primary Examiner* — Lindsay J Uhl
(74) *Attorney, Agent, or Firm* — Mattingly & Malur, PC

(57) ABSTRACT

An image processing apparatus includes: a contrast correcting unit which creates a contrast-corrected image in which contrast of an input image photographed by an in-vehicle camera that is mounted to a vehicle is corrected; a color analyzing unit which creates a color-corrected image in which a color of the input image is corrected; an object detecting unit which detects a first target object included in the input image based on the contrast-corrected image, and which detects a second target object included in the input image based on the color-corrected image; and an object association analyzing unit which recognizes the first target object and the second target object based on a time series association between the first target object and the second target object detected by the object detecting unit.

20 Claims, 16 Drawing Sheets

(51) Int. Cl.
    G06K 9/00    (2006.01)
    G06T 5/40    (2006.01)
    G08G 1/04    (2006.01)
    G08G 1/0967  (2006.01)
    G08G 1/0969  (2006.01)
    H04N 5/232   (2006.01)
    H04N 7/18    (2006.01)
    H04N 9/04    (2006.01)
    H04N 9/64    (2006.01)

(52) U.S. Cl.
    CPC ............... *H04N 7/18* (2013.01); *H04N 9/04* (2013.01); *H04N 9/64* (2013.01); *G06T 2207/10024* (2013.01); *G06T 2207/30256* (2013.01)

(56) References Cited

OTHER PUBLICATIONS

Hazelhoff, L., et al., "Combined generation of road marking and road sign databases applied to consistency checking of pedestrian crossings", 14th IAPR International Conference on Machine Vision Applications (MVA), pp. 439-4442 (2015) (Year: 2015).*

Extended European Search received in corresponding European Application No. 17197849.7 dated Mar. 27, 2018.

Malik, R. et al., "Road Sign Detection and Recognition Using Colour Segmentation, Shape Analysis and Template Matching", Proceedings of the Sixth International Conference on Machine Learning and Cybernetics, Hong Kong, Aug. 19-22, 2007, pp. 3556-3560.

Lombardi, L., et al., "Automatic Recognition of Road Sign Passo-Carrabile", Department of Information and Systems, University of Pavia, Italy, pp. 1059-1067.

Hazelhoff, L. et al., "Combined Generation of Road Marking and Road Sign Databases Applied to Consistency Checking of Pedestrian Crossings", 14th IAPR International Conference on Machine Vision Applications (MVA), Tokyo, Japan, May 18-22, 2015, pp. 439-442.

Hazelhoff, L. et al., Exploiting Street-Level Panoramic Images for Large-Scale Automated Surveying of Traffic Signs, Machine Vision and Applications, Jul. 31, 2014, pp. 1893-1911, vol. 25, No. 7.

Wu, T. et al., "Vehicle Localization Using Road Markings", 2013 IEEE Intelligent Vehicles Symposium (IV), Jun. 23-26, 2013, pp. 1185-1190.

Lafuente-Arroyo, S. et al., "Road Sign Recognition Using Spatial Dimension Reduction Methods on PCA and SVMs", Computational and Ambient Intelligence, Jun. 20, 2007, pp. 725-732.

* cited by examiner

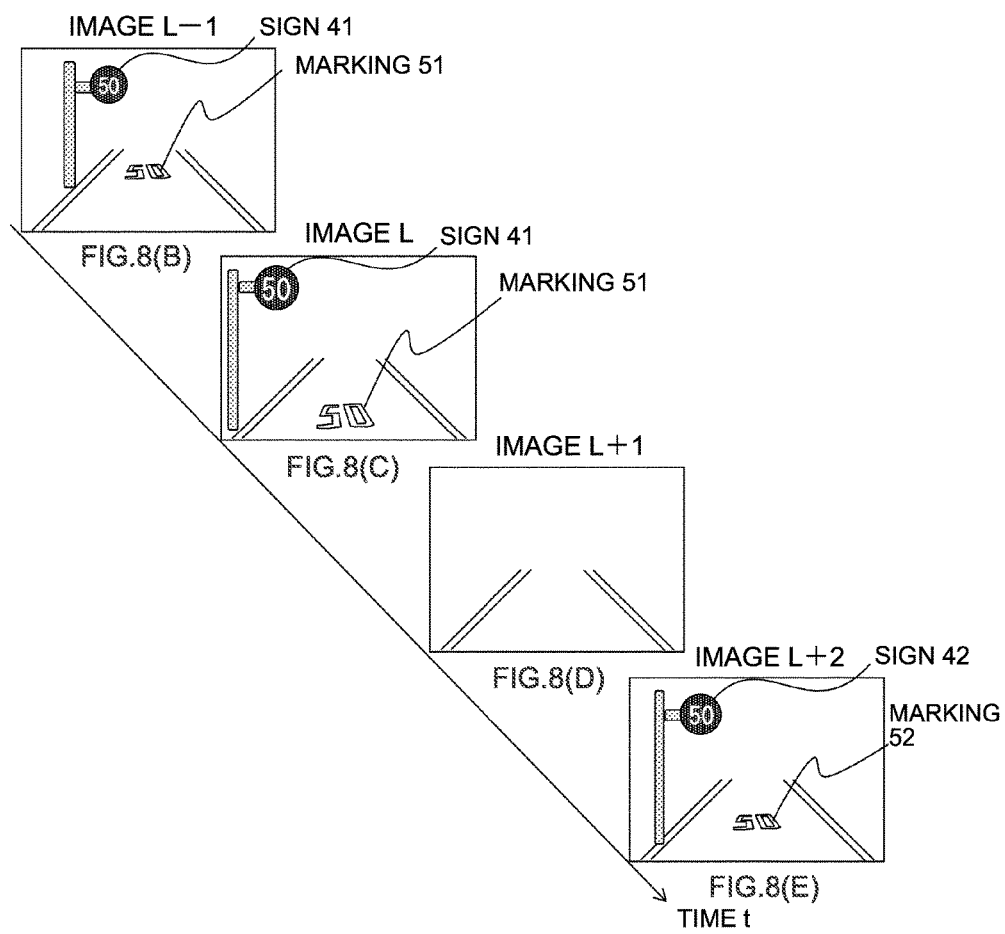

IMAGE PROCESSING APPARATUS, WARNING APPARATUS, IMAGE PROCESSING SYSTEM, AND IMAGE PROCESSING METHOD

INCORPORATION BY REFERENCE

The disclosure of the following priority application is herein incorporated by reference: Japanese Patent Application No. 2016-208026 filed Oct. 24, 2016.

BACKGROUND OF THE INVENTION

1. Field of the Invention

The present invention relates to an image processing apparatus, a warning apparatus, an image processing system, and an image processing method.

2. Description of the Related Art

In recent years, proposals are being made to use video captured by an imaging apparatus such as a smartphone and a drive recorder in order to detect road accessories in an image. For example, Japanese Laid-open Patent Publication No. 2008-139320 discloses a technique involving recognizing road accessories such as a sign and a marking that is drawn on a road surface from an image captured by a camera installed inside a vehicle and notifying a driver of information on a recognition result.

SUMMARY OF THE INVENTION

An appearance of a sign or a marking in a photographed image of a camera varies in accordance with a situation at the time of photography. For example, when a change in a direction of travel of a vehicle causes an orientation of a camera to change, in turn causing a change in a positional relationship between a sign or a marking and the sun relative to the orientation of the camera, brightness of the sign or the marking relative to brightness of an entire photographed image changes within the photographed image. However, the technique disclosed in Japanese Laid-open Patent Publication No. 2008-139320 does not particularly take this point into consideration. Therefore, there may be cases where a sign or a marking that is a target object cannot be correctly recognized from a photographed image.

An image processing apparatus according to the present invention includes: a contrast correcting unit which creates a contrast-corrected image in which contrast of an input image photographed by an in-vehicle camera that is mounted to a vehicle is corrected; a color analyzing unit which creates a color-corrected image in which a color of the input image is corrected; an object detecting unit which detects a first target object included in the input image based on the contrast-corrected image, and which detects a second target object included in the input image based on the color-corrected image; and an object association analyzing unit which recognizes the first target object and the second target object based on a time series association between the first target object and the second target object detected by the object detecting unit.

A warning apparatus according to the present invention includes: an image processing apparatus; and a warning output unit which outputs a warning to a driver of the vehicle, based on a recognition result of the first target object and the second target object by the image processing apparatus.

An image processing system according to the present invention includes: a terminal apparatus mounted to a vehicle; and a server apparatus which communicates with the terminal apparatus, wherein the terminal apparatus includes: a contrast correcting unit which creates a contrast-corrected image in which contrast of an input image photographed by an in-vehicle camera that is mounted to a vehicle is corrected; a color analyzing unit which creates a color-corrected image in which a color of the input image is corrected; an object detecting unit which detects a first target object included in the input image based on the contrast-corrected image, and which detects a second target object included in the input image based on the color-corrected image; and an image transmitting unit which transmits, to the server apparatus, a post-detection image showing a detection result of the first target object and the second target object by the object detecting unit, and the server apparatus includes: an image receiving unit which receives the post-detection image transmitted from the terminal apparatus; a second contrast correcting unit which creates a contrast-corrected image in which contrast of the post-detection image received by the image receiving unit is corrected; a second color analyzing unit which creates a color-corrected image in which a color of the post-detection image received by the image receiving unit is corrected; a second object detecting unit which detects a first target object included in the post-detection image based on the contrast-corrected image, and which detects a second target object included in the post-detection image based on the color-corrected image; and an object association analyzing unit which recognizes the first target object and the second target object based on a time series association between the first target object and the second target object in the post-detection image received by the image receiving unit.

An image processing method according to the present invention is a processing method for an input image which is photographed by an in-vehicle camera that is mounted to a vehicle and which is input to a computer, the image processing method causing the computer to execute: creating a contrast-corrected image in which contrast of the input image is corrected; creating a color-corrected image in which a color of the input image is corrected; detecting a first target object included in the input image based on the contrast-corrected image; detecting a second target object included in the input image based on the color-corrected image; and recognizing the first target object and the second target object based on a time series association between the detected first target object and the detected second target object.

According to the present invention, a target object can be correctly recognized from an image photographed with a camera.

BRIEF DESCRIPTION OF THE DRAWINGS

FIGS. 8A to 8E are diagrams for illustrating an example of an operation by an object association analyzing unit;

DESCRIPTION OF THE EMBODIMENTS

Figure 1:
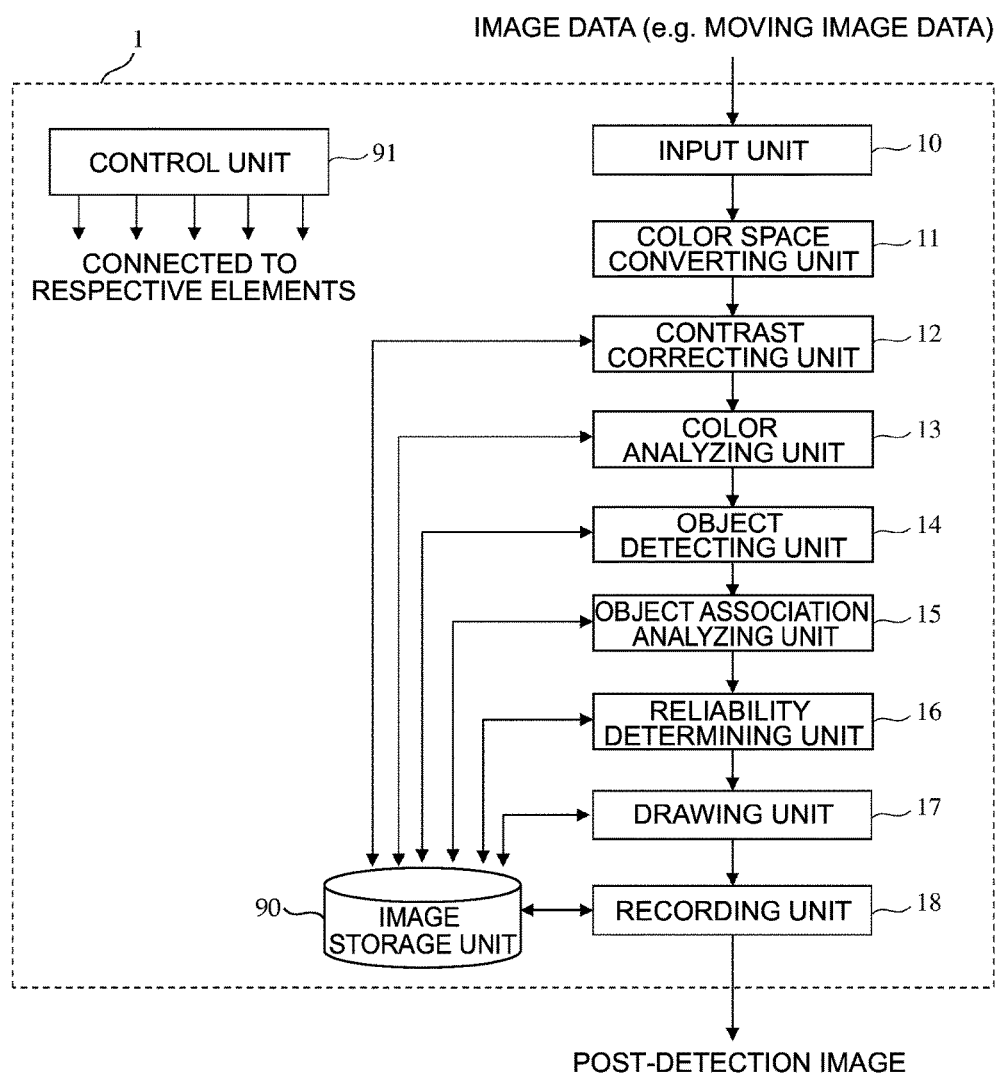
FIG. 1 is a block diagram showing a functional configuration of an image processing apparatus according to a first embodiment of the present invention.

First, a summary of the present invention will be provided below.

Generally, in order to provide information related to signs and information related to markings drawn on road surfaces which are road accessories as additional information of map information and the like, all roads to be potentially traveled by a vehicle must be surveyed in advance to check what kind of signs and markings are present, which requires a high survey cost. There is another problem in that road signs and road markings which have been modified due to a newly laid road or road construction cannot be reflected as additional information in map information in a timely manner. In consideration thereof, the embodiments of the present invention described below enable signs and markings to be detected in a timely manner using, for example, an in-vehicle terminal such as a smartphone, a drive recorder, and a car navigation apparatus from images photographed by many and unspecified users.

When a sign or a marking is recognized as a target object from a photographed image of a camera, if a change in a direction of travel of a vehicle causes an orientation of a camera to change, in turn causing a change in a positional relationship between the target object and the sun relative to the orientation of the camera, brightness of the target object relative to brightness of an entire photographed image changes within the photographed image. For example, the brightness of the target object relative to the brightness of the entire photographed image differs significantly between a case where the positional relationship between the target object and the sun represents front light and a case where the positional relationship represents backlight. In addition, the brightness of the target object relative to the brightness of the entire photographed image differs significantly between a case where the target object is exposed to direct sunlight and a case where the target object is not exposed to direct sunlight. Therefore, there may be cases where a sign or a marking that is a target object cannot be correctly recognized from a photographed image. In such cases, a user cannot be notified of correct information on the sign or the marking. In particular, with the technique according to Japanese Laid-open Patent Publication No. 2008-139320 described earlier, there is a problem in that a sign or a marking cannot be correctly detected and a user cannot be notified of correct information on the sign or the marking. In consideration thereof, the embodiments of the present invention described below propose a technique which enables a desired target object in an image photographed by an in-vehicle terminal to be detected and which enables a target object to be specified from detection results of target objects.

In addition, the embodiments of the present invention provide an image processing apparatus and a method thereof which, even when a brightness of a photographed image changes, separate a background in the image and an object in the background from each other and realize specification of a target object using a result of object detection in the background and a result of detection of target objects.

Hereinafter, embodiments of the present invention will be described with reference to the drawings.

First Embodiment

Functional Configuration of Image Processing Apparatus

FIG. 1 is a block diagram showing a functional configuration of an image processing apparatus 1 according to a first embodiment of the present invention. As shown in FIG. 1, as functions thereof, the image processing apparatus 1 includes an input unit 10, a color space converting unit 11, a contrast correcting unit 12, a color analyzing unit 13, an object detecting unit 14, an object association analyzing unit 15, a reliability determining unit 16, a drawing unit 17, a recording unit 18, an image storage unit 90, and a control unit 91. Moreover, the respective functions of the image processing apparatus 1 shown in FIG. 1 are realized by combining various programs and hardware in, for example, a portable mobile terminal apparatus such as a smartphone or an information device such as a personal computer and a server apparatus.

The input unit 10 acquires an input image to be made a processing target in the image processing apparatus 1 from the outside. Data of images photographed by an in-vehicle camera (not shown) mounted to a vehicle is input as the input image to the input unit 10 at prescribed time intervals. Alternatively, a drive recorder installed in the vehicle, a camera included in a portable mobile terminal apparatus such as a smartphone, or the like can be used as the in-vehicle camera. In addition, a photographed image of an in-vehicle camera acquired via an information communication network or a recording medium (both not shown) may be used as the input image. The input image may be a still image, or any frame in a moving image may be extracted to create the input image. As a data format of a still image, for example, JPEG, JPEG2000, PNG, or BMP is used. On the other hand, as a data format of a moving image, for example, MotionJPEG, MPEG, H.264, or HD/SDI is used.

The color space converting unit 11 acquires brightness information of a color in the input image by converting a color space of the input image.

The contrast correcting unit 12 uses brightness information of a color of a previous input image stored in the image storage unit 90 and brightness information of a color of the present input image obtained by the color space converting unit 11 to obtain a brightness variation of the color of the present input image, and creates an image in which contrast of brightness and darkness of the input image is corrected based on the brightness variation. Hereinafter, the image created by the contrast correcting unit 12 will be referred to as a contrast-corrected image.

The color analyzing unit 13 creates an image in which the color of the input image is corrected by analyzing a relationship of a color in each pixel of the input image using a primary color difference value and a threshold for color analysis. Hereinafter, the image created by the color analyzing unit 13 will be referred to as a color-corrected image.

The object detecting unit 14 detects a sign and a marking included in the input image as detection target objects using the contrast-corrected image created by the contrast correcting unit 12 and the color-corrected image created by the color analyzing unit 13, and recognizes contents of the detection target objects. Moreover, the sign detected by the object detecting unit 14 refers to a road sign installed on or near a road and the marking detected by the object detecting unit 14 refers to a road marking drawn on a road surface. Specifically, the object detecting unit 14 obtains a threshold for separating a sign from the contrast-corrected image and, using the threshold, separates a background and a sign in the contrast-corrected image from each other. In addition, by detecting a portion corresponding to a marking from the color-corrected image, the object detecting unit 14 separates a background and a marking in the color-corrected image from each other. By respectively extracting the sign and the marking from the contrast-corrected image and the color-corrected image in this manner and comparing the sign and the marking with a reference image set in advance, the sign and the marking are detected and contents of a traffic regulation or an instruction indicated by the sign and the marking are recognized.

The object association analyzing unit 15 analyzes, based on a recognition result of the sign and the marking detected by the object detecting unit 14, an association between these objects. As a result, by combining a sign and a marking for which a high association is determined, contents of a traffic regulation or an instruction indicated by the sign and the marking are recognized.

The reliability determining unit 16 acquires and accumulates positions of the signs and markings detected by the object detecting unit 14 and, based on an accumulation result thereof, determines reliabilities of the detected objects.

The drawing unit 17 draws, with respect to the signs and markings detected by the object detecting unit 14, detection frames which enclose these objects on the input image. Since an image on which a detection frame has been drawn by the drawing unit 17 is an image representing a detection result of a sign and a marking by the object detecting unit 14, this image will be hereinafter referred to as a post-detection image.

The recording unit 18 causes the image storage unit 90 to store and save the post-detection image created by the drawing unit 17. Moreover, the post-detection image is also output to the outside from the image processing apparatus 1.

The control unit 91 is connected to the respective components of the image processing apparatus 1 described above and controls operations of the components. Alternatively, each component may operate autonomously as necessary instead of being controlled by the control unit 91.

Hardware Configuration of Image Processing Apparatus

Figure 2:
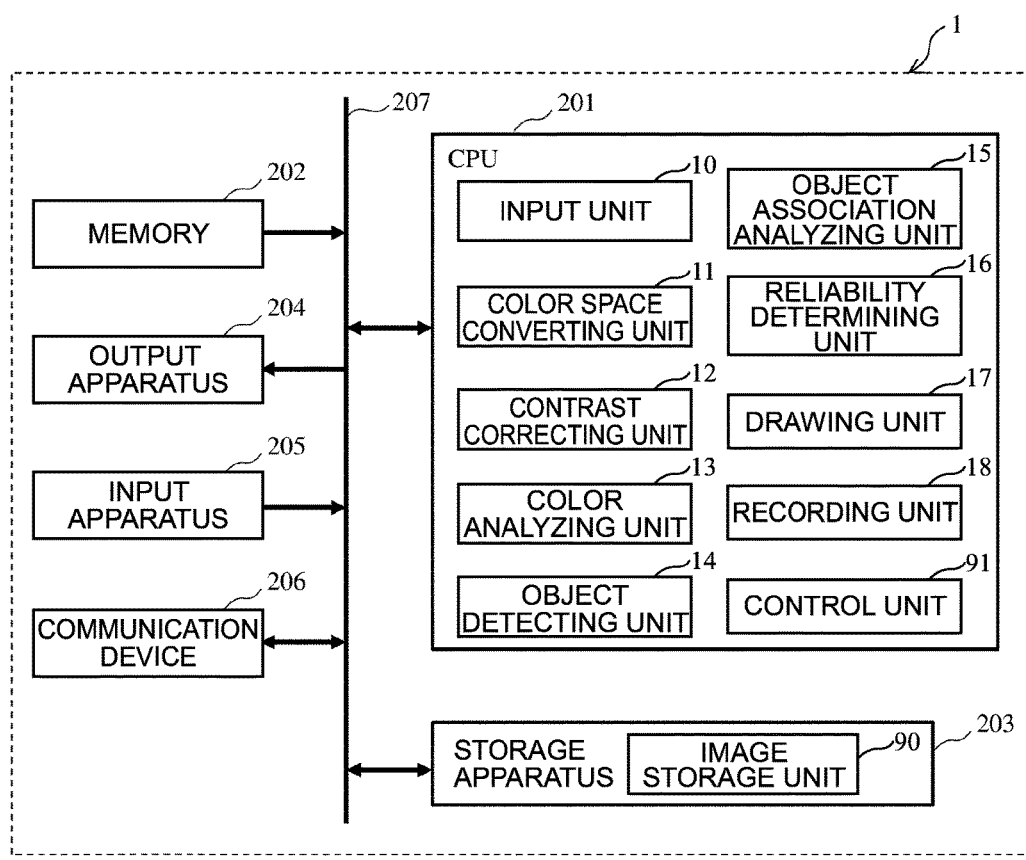
FIG. 2 is a diagram showing an example of a hardware configuration of an image processing apparatus according to the first embodiment of the present invention.

FIG. 2 is a diagram showing an example of a hardware configuration of the image processing apparatus 1 according to the first embodiment of the present invention. As shown in FIG. 2, the image processing apparatus 1 includes a CPU 201, a memory 202, a storage apparatus 203, an output apparatus 204, an input apparatus 205, and a communication device 206, and a bus 207 connects these hardware components with each other.

The CPU 201 is a processor which reads various programs from the memory 202 as necessary and executes processes in accordance with the programs. The respective functional components including the input unit 10, the color space converting unit 11, the contrast correcting unit 12, the color analyzing unit 13, the object detecting unit 14, the object association analyzing unit 15, the reliability determining unit 16, the drawing unit 17, the recording unit 18, and the control unit 91 described with reference to FIG. 1 are realized by processes executed by the CPU 201.

The memory 202 stores various programs to be read by the CPU 201 and temporarily stores, as necessary, various data to be used in processes being executed by the CPU 201.

The storage apparatus 203 is an apparatus which stores various data to be used in the image processing apparatus 1 and corresponds to the image storage unit 90 described with reference to FIG. 1. For example, the storage apparatus 203 stores the input image, the contrast-corrected image, the color-corrected image, the reference image, and the post-detection image described earlier. In addition, previous input images are also stored in the storage apparatus 203.

The output apparatus 204 is an apparatus for outputting the post-detection image and is constituted by a device such as a display, a printer, and a speaker. For example, when a display is used as the output apparatus 204, the post-detection image generated by the drawing unit 17 is displayed on a screen of the display.

The input apparatus 205 is an apparatus for inputting instructions and the like by a user and is constituted by a device such as a keyboard, a mouse, and a microphone. For example, an input image to be made a processing target in the image processing apparatus 1 is determined in accordance with an instruction by the user via the input apparatus 205.

The communication device 206 is an apparatus for communicating with other apparatuses. For example, using the communication device 206, an input image transmitted from an in-vehicle camera can be received and various kinds of data can be transmitted to and received from a server apparatus connected via a network. Alternatively, instead of providing the communication device 206 inside the image processing apparatus 1, the communication device 206 provided outside may be connected to the image processing apparatus 1.

Configuration and Operation of Each Part

Next, operations of the respective functional components including the color space converting unit 11, the contrast correcting unit 12, the color analyzing unit 13, the object detecting unit 14, the object association analyzing unit 15, the reliability determining unit 16, the drawing unit 17, and the recording unit 18 described above will be described in detail below.

(i) Color Space Converting Unit 11

As brightness information of the color in an input image, for example, the color space converting unit 11 generates an image in which an RGB color space of the input image is converted into a Lab color space. Due to the Lab color space conversion, an L value, an a value, and a b value corresponding to the input image are acquired. The L value is information corresponding to lightness and the a and b values are information representing brightness of the color.

Figure 3:
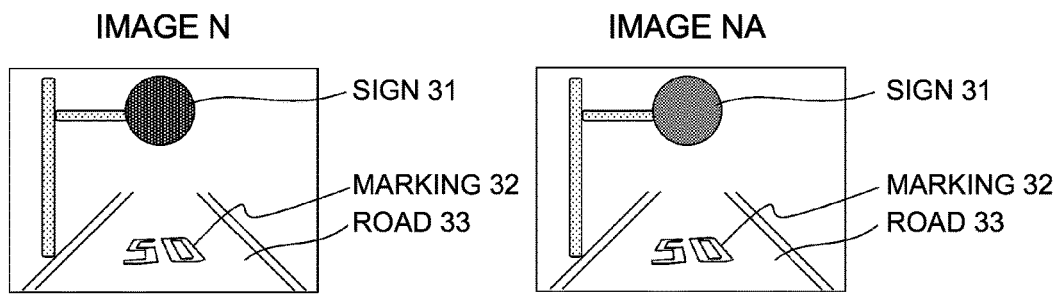
FIG. 3 is a diagram for illustrating an example of an operation by a color space converting unit.

FIG. 3 is a diagram for illustrating an example of an operation by the color space converting unit 11. In FIG. 3, a left-side image N represents an example of an input image expressed by an RGB color space, and a right-side image NA represents an example of the input image after color space conversion which is expressed by a Lab color space. These images include a sign 31, a marking 32, and a road 33. The image NA after color space conversion obtained by the color space converting unit 11 is stored in the image storage unit 90.

(ii) Contrast Correcting Unit 12

The contrast correcting unit 12 creates a contrast-corrected image as described below using brightness information of a color or, in other words, at least one of an a value and a b value of the input image after color space conversion obtained by the color space converting unit 11.

Figure 4:
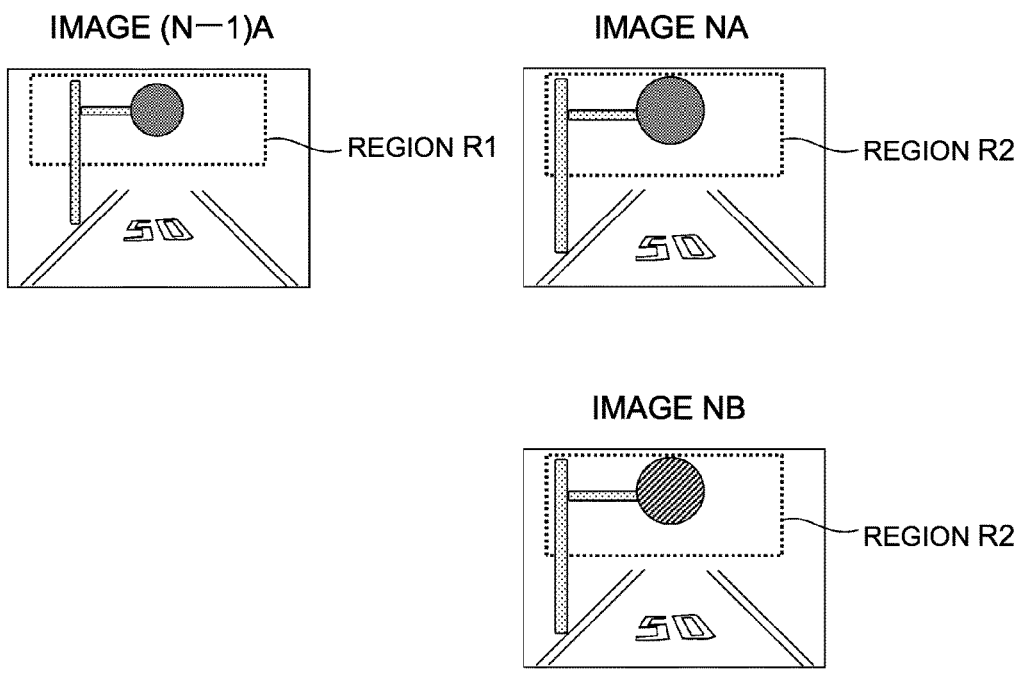
FIG. 4 is a diagram for illustrating an example of an operation by a contrast correcting unit.

FIG. 4 is a diagram for illustrating an example of an operation by the contrast correcting unit 12. In FIG. 4, a left-side image (N−1)A represents an example of an image obtained by converting a color space of a previously acquired input image (N−1), and a right upper-side image NA represents an example of an image obtained by converting a color space of the present input image N in a similar manner to FIG. 3. In addition, a right lower-side image NB represents an example of an image after contrast correction.

The contrast correcting unit 12 sets a target region R2 of contrast correction with respect to a prescribed range of the image NA, and calculates an average value aveR2 of color information (a value or b value) in the region R2 of the image NA. The average value aveR2 corresponds to an average value of brightness of a color in the region R2 of the input image N. Moreover, a position and a shape of the region R2 can be set in advance as a range in which a sign is likely to be present in the image NA based on a mounting position, a direction of photography, an angle of view, and the like of the in-vehicle camera.

In addition, the contrast correcting unit 12 sets a target region R1 of contrast correction corresponding to the region R2 described above with respect to the image (N−1)A, and calculates an average value aveR1 of color information (a value or b value) in the region R1 of the image (N−1)A. The average value aveR1 corresponds to an average value of brightness of a color in the region R2 of a previous image (N−1). Moreover, a position and a shape of the region R1 may be the same as those of the region R2 or may be determined in consideration of a distance of travel by the vehicle between acquiring the previous input image (N−1) and acquiring the present input image N.

Once the average values aveR2 and aveR1 are calculated, the contrast correcting unit 12 next calculates a magnification value v for creating a contrast-corrected image using expression (1) below.

$$V=E2/E1 \quad (1)$$

In expression (1), E1 and E2 respectively denote one of the average values aveR2 and aveR1. Specifically, when aveR1≥aveR2, E1=aveR2 and E2=aveR1. On the other hand, when aveR1<aveR2, E1=aveR1 and E2=aveR2. Alternatively, the magnification value v may be a fixed value.

Once the magnification value v is calculated, the contrast correcting unit 12 next obtains a brightness value cnCor of a color after contrast correction with respect to each pixel in the region R2 of the image NA using expression (2) below. In expression (2), cn denotes an a value or a b value of each pixel in the region R2 of the image NA.

$$cnCor=cn-(aveR2-cn)*v \quad (2)$$

Calculating the brightness value cnCor of a color after correction with respect to each pixel in the region R2 of the image NA using expression (2) above enables the contrast of the image NA to be corrected so that pixels that are darker than average become darker and pixels that are lighter than average become lighter. Even when the sign 31 that is a detection target is buried in the background and is hardly visible in the original image NA, performing such a correction enables the sign 31 to be readily detected in subsequent processes.

By obtaining the cnCor value for each pixel with respect to the region R2 of the image NA due to the process described above, the contrast correcting unit 12 corrects the contrast of the image NA and creates the contrast-corrected image NB.

(iii) Color Analyzing Unit 13

The color analyzing unit 13 calculates a color difference value of an input image as follows and creates a color-corrected image using the color difference value.

Figure 5:
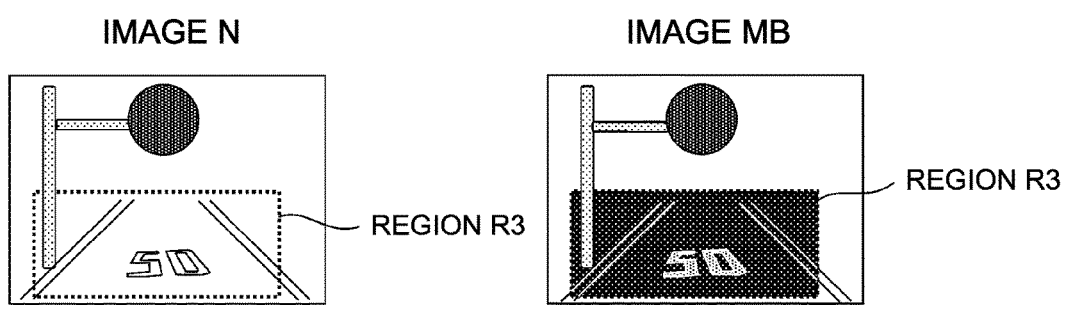
FIG. 5 is a diagram for illustrating an example of an operation by a color analyzing unit.

FIG. 5 is a diagram for illustrating an example of an operation by the color analyzing unit 13. In FIG. 5, a left-side image N represents an example of an input image expressed by an RGB color space in a similar manner to FIG. 3, and a right-side image MB represents an example of an image after color correction.

The color analyzing unit 13 sets a target region R3 of color correction with respect to a prescribed range of the input image N and calculates a color difference value for each pixel in the region R3. A position and a shape of the region R3 can be set in advance as a range in which a marking is likely to be present in the image N based on a mounting position, a direction of photography, an angle of view, and the like of the in-vehicle camera. Specifically, from a color information value R, G, or B for each primary color of each pixel, an absolute value s_R, s_G, or s_B of a color difference for each primary color of each pixel is obtained using expression (3) below. In expression (3), abs denotes an absolute value.

$$s\_R=\text{abs}(R-G),\ s\_G=\text{abs}(G-B),\ s\_B=\text{abs}(B-R) \quad (3)$$

When the absolute values s_R, s_G, and s_B of the color difference obtained according to expression (3) above are all equal to or smaller than a prescribed threshold Th_s, the color analyzing unit 13 sets original color information values R, G, and B with respect to the pixel without modification. On the other hand, when any one of the obtained absolute values s_R, s_G, and s_B of the color difference exceeds the threshold Th_s, the color analyzing unit 13 sets all of the color information values of the pixel to 0 so that R=G=B=0. Moreover, the threshold Th_s has a value of, for example, Th_s=30.

By resetting color information values for each pixel with respect to the region R3 of the input image by the process described above, the color analyzing unit 13 corrects the color of the input image N and creates the color-corrected image MB in which the color in the region R3 of the input image N has been masked.

(iv) Object Detecting Unit 14

The object detecting unit 14 creates, based on the contrast-corrected image created by the contrast correcting unit 12, an image for detecting a sign included in an input image as follows.

Figure 6:
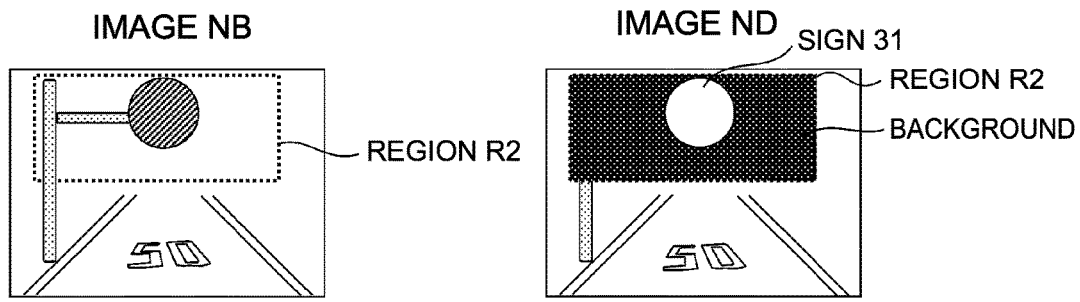
FIG. 6 is a diagram for illustrating an example of an operation by an object detecting unit.

FIG. 6 is a diagram for illustrating an example of an operation by the object detecting unit 14. In FIG. 6, a left-side image NB represents an example of an image after contrast correction in a similar manner to FIG. 4, and a right-side image ND represents an example of an image in which a sign and a background have been separated.

The object detecting unit 14 calculates, using expression (4) below, a weighted average value aveRN by weighting average values aveR1 and aveR2 of brightness of colors in the images (N−1) and N described above calculated by the contrast correcting unit 12. In expression (4), C2/C1 represents a weighting coefficient with respect to the previous input image (N−1) and C3/C1 represents a weighting coefficient with respect to the present input image N. In addition, C1=C2+C3.

$$aveRN=aveR1*C2/C1+aveR2*C3/C1 \quad (4)$$

In expression (4), when desiring to approximate the weighted average value aveRN to the brightness of the color of the previous input image (N−1), a weight of the previous input image (N−1) may be increased by setting C2 larger than C3. Conversely, when desiring to approximate the weighted average value aveRN to the brightness of the color of the present input image N, a weight of the present input image N may be increased by setting C3 larger than C2. However, since excessively weighting the present input image N by increasing C3 may prevent a sign from being accurately detected in a subsequent process, the previous input image (N−1) must also be taken into consideration to a certain extent by not making the weight C2 excessively small. For example, when increasing the weight of the previous input image (N−1), settings of C2=0.9 and C3=0.1 may be adopted. In addition, when increasing the weight of the present input image N, settings of C2=C3=0.5 are conceivably adopted.

Once the weighted average value aveRN is calculated as described above, the object detecting unit 14 next obtains a threshold Th for separating a sign that is a detection target and a background from the contrast-corrected image NB using expression (5) below.

$$Th=aveRN+\alpha \quad (5)$$

α in expression (5) above denotes a correction value for setting the threshold Th based on the weighted average value aveRN. Appropriately setting a value of the correction value α enables only pixels of which brightness is equal to or higher than a desired brightness or pixels of which brightness is equal to or lower than a desired brightness to be extracted from the contrast-corrected image NB. In other words, α in expression (5) is a parameter for enabling the sign that is a detection target object to be more readily segmented from the contrast-corrected image NB.

When the a value of each pixel in the region R2 of the image NA is set to cn in expression (2) described earlier, the brightness value cnCor of a color of each pixel of the contrast-corrected image NB is set in accordance with the a value of each pixel in the image NA. In this case, the object detecting unit 14 obtains the threshold Th for each image by setting α to a positive value in expression (5) and, using the threshold Th, creates the image ND in which the background and the sign 31 are separated from the region R2 of the contrast-corrected image NB. Specifically, for each pixel in the region R2 of the contrast-corrected image NB, brightness of the color after separation is set to a value s (for example, s=255) when cnCor≥Th, but brightness of the color after separation is set to a value t (for example, t=0) when cnCor<Th. Accordingly, an object of which brightness of the color is equal to or higher than a prescribed value in the region R2 can be efficiently separated as the sign 31.

On the other hand, when the b value of each pixel in the region R2 of the image NA is set to cn in expression (2) described earlier, the brightness value cnCor of the color of each pixel of the contrast-corrected image NB is set in accordance with the b value of each pixel in the image NA. In this case, the object detecting unit 14 obtains the threshold Th for each image by setting α to a negative value in expression (5) and, using the threshold Th, creates the image ND in which the background and the sign 31 are separated from the region R2 of the contrast-corrected image NB. Specifically, for each pixel in the region R2 of the contrast-corrected image NB, brightness of the color after separation is set to the value s (for example, s=255) when cnCor≤Th, but brightness of the color after separation is set to the value t (for example, t=0) when cnCor>Th. Accordingly, an object of which brightness of the color is equal to or lower than a prescribed value in the region R2 can be efficiently separated as the sign 31.

According to the process described above, the object detecting unit 14 compares the cnCor value with the threshold Th for each pixel in the region R2 of the contrast-corrected image NB, and by setting brightness of the color after separation based on a result of the comparison, creates a separated image ND in which the sign 31 that is a detection target object and a background are separated from the contrast-corrected image NB. The separated image ND includes many candidates of the sign 31.

In addition, the object detecting unit 14 creates, based on the color-corrected image created by the color analyzing unit 13, an image for detecting a marking included in an input image as follows.

Figure 7:
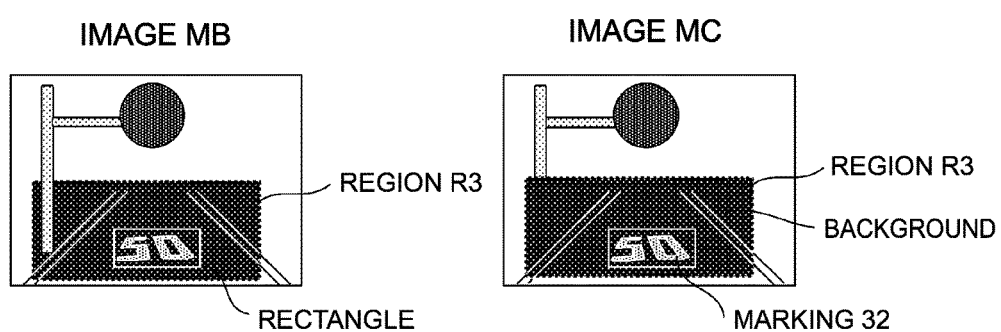
FIG. 7 is a diagram for illustrating an example of an operation by an object detecting unit.

FIG. 7 is a diagram for illustrating an example of an operation by the object detecting unit 14. In FIG. 7, a left-side image MB represents an example of an image after color correction in a similar manner to FIG. 5, and a right-side image MC represents an example of an image in which a marking and a background have been separated.

By extracting a rectangular portion corresponding to a shape of a marking in the region R3 of the color-corrected image MB, the object detecting unit 14 creates the image MC in which the marking 32 that is a detection target object and a background are separated from the color-corrected image MB. The separated image MC includes many candidates of the marking 32.

Once the separated image ND corresponding to the sign 31 and the separated image MC corresponding to the marking 32 are created as described above, the object detecting unit 14 next executes a process of identifying which of the sign 31 and the marking 32 the detection target object separated from the background in these images corresponds to. In this process, for example, the object detecting unit 14 reads, from the image storage unit 90, a reference image set in advance in correspondence with the sign or the marking to be identified and, by respectively comparing the separated images ND and MC with the reference image, determines whether the detection target object is the sign 31 or the marking 32. Specifically, for example, using respective RGB values of the reference image and the separated image ND (or MC), a histogram A of the reference image and a histogram B of the separated image ND (or MC) are created, and a similarity between the histograms A and B is calculated based on the shapes of the histograms or a Bhattacharyya distance between the histograms. Using the similarity, a determination is made on whether or not the sign 31 (or the marking 32) is included in the separated image ND (or MC).

The similarity between the histograms A and B can be calculated using, for example, expression (6) below. In expression (6), B32(c) denotes the Bhattacharyya distance between the histograms A and B. A similarity R can be calculated using B32(r) related to a r component, B32(g) related to a g component, and B32(b) related to a b component of B32(c). In this case, c represents any of r, g, and b. In addition, HA(I) and HB(I) respectively denote a frequency of a gradation value I of the histograms A and B, and HSUM denotes a sum of bins of the histograms.

[Math 1]

$$B32(c) = \sqrt{1 - \frac{1}{HSUM} \sum_{I=0}^{31} \sqrt{HA(I) \times HB(I)}} \quad (6)$$

$$R = \sqrt{B32(r)^2 + B32(g)^2 + B32(b)^2}$$

According to the process described above, the object detecting unit 14 calculates the similarity between histograms and determines degrees of similarity between the reference image and the sign 31 or the marking 32 that are detection target objects. Accordingly, the sign 31 and the marking 32 can be respectively detected from the separated images ND and MC using a reference image set in advance. Furthermore, in addition to the determination of the similarity between histograms, an identifier may be created from feature amounts of images by machine learning using a known neural network and a determination involving identifying a detected object using the identifier may be performed. In other words, when a plurality of reference images determined to have a high similarity are detected, which image is correct (probable) as a detected object is identified by an identifier using a neural network.

(v) Object Association Analyzing Unit 15

The object association analyzing unit 15 analyzes an association between a sign and a marking detected and identified by the object detecting unit 14. Hereinafter, a process by the object association analyzing unit 15 will be described using a case where an object in the separated image ND is detected and identified as a sign by the object detecting unit 14 and an object in the separated image MC is detected and identified as a marking by the object detecting unit 14.

FIGS. 8A to 8E are diagrams for illustrating an example of an operation by the object association analyzing unit 15. FIG. 8A shows an example of a road traveled by a vehicle mounted with the image processing apparatus 1. Signs 41 and 42 are installed along the road and markings 51 and 52 are drawn on a surface of the road. FIGS. 8B, 8C, 8D, and 8E show examples of images that have been photographed time-sequentially by an in-vehicle camera that is mounted at the front of the vehicle and input to the image processing apparatus 1 when the vehicle travels on the road in FIG. 8A from a left side toward a right side in the diagrams.

The sign 41 and the marking 51 appear in an input image L−1 shown in FIG. 8B to be input first. By respectively creating the separated images ND and MC from the contrast-corrected image NB and the color-corrected image MB created based on the input image L−1 and comparing the separated images ND and MC with a reference image as described above, the object detecting unit 14 detects and recognizes the sign and the marking that are detection target objects in the input image L−1. Let us assume that, as a result, the sign 41 is detected from the input image L−1, contents of a traffic regulation indicated by the sign 41 or, in other words, a numerical value (unit: km/hour) of a speed limit indicated by the sign 41 is recognized as either "60" or "50", and recognition rates thereof are respectively 0.6 and 0.5. With the detection of the sign 41 as a starting point, the object association analyzing unit 15 analyzes an association between the sign 41 and the marking 51 for a certain period of time such as until a next sign 42 is detected. Moreover, a recognition rate is a value representing a likelihood of a recognition result. For example, a value 0.6 of the recognition rate corresponding to the recognition result "60" described above represents that the likelihood of the numerical value of the speed limit indicated by the sign 41 being "60" is 0.6 (60%).

In an input image L shown in FIG. 8C to be input next, the sign 41 and the marking 51 appear larger than in the input image L−1. The object detecting unit 14 detects and recognizes the sign and the marking that are detection target objects in the input image L according to a method similar to that used on the input image L−1. Let us assume that, as a result, the sign 41 is detected from the input image L, the numerical value of the speed limit indicated by the sign 41 is either "60" or "50", and recognition rates thereof are respectively 0.5 and 0.7. Let us also assume that the marking 51 is detected from the input image L, contents of a traffic regulation indicated by the marking 51 or, in other words, a numerical value of a speed limit indicated by the marking 51 is recognized as either "60" or "50", and recognition rates thereof are respectively 0.4 and 0.6.

The sign 41 and the marking 51 do not appear in an input image L+1 shown in FIG. 8D to be input next. Therefore, the object detecting unit 14 is unable to detect any sign or marking in the input image L+1.

A next sign 42 and a next marking 52 appear in an input image L+2 shown in FIG. 8E to be input next. The object detecting unit 14 similarly detects and recognizes the sign and the marking that are detection target objects in the input image L+2. Let us assume that, as a result, the sign 42 is detected from the input image L+2, the numerical value of the speed limit indicated by the sign 42 is either "60" or "50", and recognition rates thereof are respectively 0.6 and 0.5.

Based on detection results of the signs 41 and 42 and the marking 51 by the object detecting unit 14 in the input images L−1 to L+2 as described above, the object association analyzing unit 15 specifies a recognition result with respect to the detection target objects. For example, an average value of recognition rates is calculated for each recognition result of a detection target object and a recognition result is specified based on the calculation result. Specifically, in the example described above, the average value of recognition rates with respect to the recognition result "60" is calculated as 0.525 and the average value of recognition rates with respect to the recognition result "50" is calculated as 0.575. Therefore, the object association analyzing unit 15 determines "50" that is the recognition result with the higher average value as the recognition result with respect to the signs 41 and 42 and the marking 51.

Moreover, in the example described above, contents of the traffic regulation or, in other words, the speed limit represented by the signs 41 and 42 respectively detected in the input images L−1, L, and L+1 and contents of the traffic regulation or, in other words, the speed limit represented by the marking 51 detected in the input image L are the same in the input images. In this manner, when a condition is satisfied in that contents of traffic regulations respectively indicated by signs and markings detected by the object detecting unit 14 are the same in a prescribed number or more of input images that have been acquired time-sequentially, the object association analyzing unit 15 can recognize these signs and markings in association with each other. As a result, a recognition result of the sign and the marking that are detection target objects can be determined using the method described above. Furthermore, when instructions respectively indicated by the sign and the marking that are detection target objects are the same, such as when the sign and the marking both indicate the presence of a pedestrian crossing, the object association analyzing unit 15 can recognize the detection target objects in association with each other in a similar manner to the example described above.

On the other hand, when contents of traffic regulations or instructions respectively indicated by signs and markings detected by the object detecting unit 14 differ from one another, such as when the sign 41 represents a 50 km speed limit and the marking 42 represents no parking and stopping in the example described above, the object association analyzing unit 15 does not associate the detection target objects with each other. In this case, subsequent processes may be performed using a recognition result of the object detecting unit 14 with respect to each detection target object.

According to the process described above, based on a time series association between the signs 41 and 42 and the marking 51 detected by the object detecting unit 14, the object association analyzing unit 15 recognizes the detection target objects.

Moreover, while an association between a sign and a marking is analyzed by the object association analyzing unit 15 for a certain period of time with the detection of the sign 41 as a starting point in the example described above, the detection of the marking 51 may be used as a starting point in a similar manner. In addition, when the sign 41 is detected in a plurality of consecutive frames of an input image, the object association analyzing unit 15 may analyze an association between a sign and a marking until an end of a final frame of the input image or until the next sign 42 is detected.

Furthermore, when one of a sign and a marking associated with each other in the process described above has a high recognition rate and the other has a low recognition rate, the object association analyzing unit 15 may determine that the sign or the marking corresponding to the latter has been degraded as will be described later.

Figure 9A:
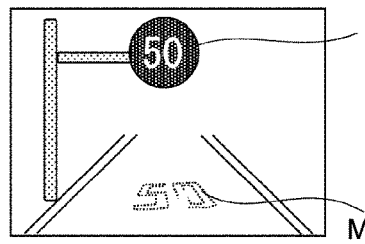
FIGS. 9A and 9B are diagrams for illustrating an example of a degradation determination by an object association analyzing unit.
Figure 9B:
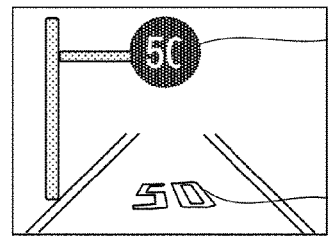

FIGS. 9A and 9B are diagrams for illustrating an example of a degradation determination by the object association analyzing unit 15. Let us assume that, in an input image shown in FIG. 9A, a sign 61 is detected by the object detecting unit 14, contents of the sign 61 or, in other words, a numerical value of a speed limit indicated by the sign 61 is recognized as "50", and a recognition rate thereof is equal to or higher than a prescribed threshold such as 0.8. In this case, using two recognition rate thresholds such as 0.5 and 0.3, the object detecting unit 14 can detect a marking 62 from the input image shown in FIG. 9A. Let us assume that, as a result, the marking 62 cannot be detected with the higher of the two thresholds or, in other words, 0.5 but the marking 62 can be detected with the lower threshold 0.3. In this case, the object association analyzing unit 15 recognizes a numerical value of a speed limit indicated by the marking 62 as "50" being the same as the sign 61 and also determines that degradation such as blurring has occurred on the marking 62.

In addition, let us assume that, in an input image shown in FIG. 9B, the marking 62 is detected by the object detecting unit 14, contents of the marking 62 or, in other words, the numerical value of the speed limit indicated by the marking 62 is recognized as "50", and a recognition rate thereof is equal to or higher than a prescribed threshold such as 0.8. In this case, using two recognition rate thresholds such as 0.5 and 0.3 in a similar manner to the example described above, the object detecting unit 14 can detect the sign 61 from the input image shown in FIG. 9B. Let us assume that, as a result, the sign 61 cannot be detected with the higher of the two thresholds or, in other words, 0.5 but the sign 61 can be detected with the lower threshold 0.3. In this case, the object association analyzing unit 15 recognizes the numerical value of the speed limit indicated by the sign 61 as "50" being the same as the marking 62 and also determines that degradation such as blurring has occurred on the sign 61.

When the object association analyzing unit 15 determines that one of a sign and a marking is degraded by the process described above, the object association analyzing unit 15 sets and outputs a determination flag f in accordance with the determination result. For example, when a marking is determined to be degraded, the determination flag f is set to 1 and when a sign is determined to be degraded, the determination flag f is set to 2. Moreover, when it is determined that neither the sign nor the marking is degraded, the determination flag f is set to 0.

At this point, the object association analyzing unit 15 may prioritize a detection result of any of a sign and a marking in accordance with a surrounding environment of a vehicle or the like to determine recognition results of the sign and the marking that are detection target objects. For example, since a marking is conceivably more readily detected than a sign at night since the road surface is illuminated by car lights, a detection result of the marking is prioritized. In this case, the detection result of the marking can be prioritized by adding a prescribed offset value such as 0.2 to the recognition rate of the marking obtained as a detection result by the object detecting unit 14 or lowering the threshold with respect to the recognition rate by which the object detecting unit 14 detects a marking from for example, 0.5 to 0.3. In addition, for example, when the vehicle is traveling on a snow-covered road, the detection result of a sign is prioritized since detecting a marking is conceivably difficult. In this case, a determination on whether the vehicle is traveling on a snow-covered road can be made based on a brightness value of a region corresponding to the road in the input image. For example, when an average brightness of the region is equal to or higher than 180, the vehicle is determined to be traveling on a snow-covered road and the detection result of the sign is prioritized.

In addition, depending on the contents of traffic regulations and instructions respectively indicated by signs and markings, there are cases where both a sign and a marking are provided and cases where only one of a sign and a marking is provided. Examples of traffic regulations and instructions which provide both a sign and a marking include maximum speed and no turns, examples of traffic regulations and instructions which only provide a sign include do not enter, and examples of traffic regulations and instructions which only provide a marking include a no stopping zone. Therefore, the object association analyzing unit 15 may select which recognition result is to be used as a basis in determining a recognition result of detection target objects in a certain road section in accordance with types of such signs and markings.

A case will now be considered in which both a sign and a marking are provided with respect to a traffic regulation or an instruction indicated by an initially-detected sign or marking as in the example described above with reference to FIGS. 8A to 8E. In such a case, the object association analyzing unit 15 uses recognition results of both a sign and a marking in a certain road section to determine recognition results of these detection target objects. Meanwhile, when only a sign is provided with respect to a traffic regulation or an instruction indicated by an initially-detected sign, the object association analyzing unit 15 determines a recognition result of the sign that is a detection target object using only a recognition result of the sign in a certain road section. In addition, when only a marking is provided with respect to a traffic regulation or an instruction indicated by an initially-detected marking, the object association analyzing unit 15 determines a recognition result of the marking that is a detection target object using only a recognition result of the marking in a certain road section. In this manner, the object association analyzing unit 15 can switch recognition results to be made a processing target in accordance of a type of the detected sign or marking.

(vi) Reliability Determining Unit 16

Figure 10:
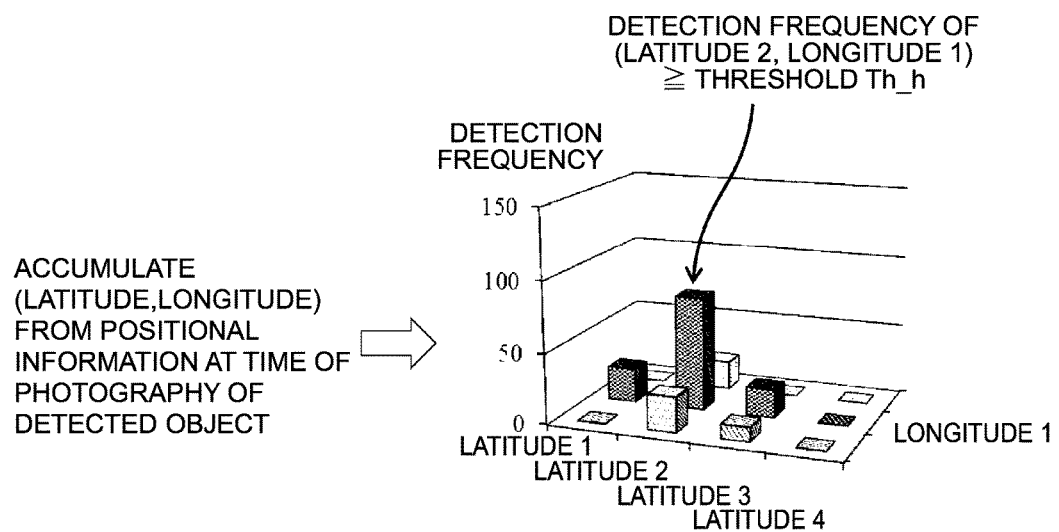
FIG. 10 is a diagram for illustrating an example of an operation by a reliability determining unit.

The reliability determining unit 16 determines, with respect to a sign and a marking detected by the object detecting unit 14, a reliability of detection results of these objects. FIG. 10 is a diagram for illustrating an example of an operation by the reliability determining unit 16.

The reliability determining unit 16 acquires a position (latitude and longitude) of each detected object based on positional information of the vehicle, and a mounting position, a direction of photography, an angle of view, and the like of the in-vehicle camera at the time of photography of each object. In addition, as shown in FIG. 10, a detection frequency of an acquired position is accumulated for each object and stored in the storage apparatus 203. At this point, a detection result of the image processing apparatus 1 in the possession of another user may be acquired and added to the accumulated result. As a result, detection results of a plurality of detections are accumulated for each object or, in other words, each sign and each marking.

Once an accumulated result of an acquired position is obtained for each sign and each marking as described above, the reliability determining unit 16 compares an accumulated detection frequency with a threshold Th_h set in advance. As a result, when the detection frequency is equal to or higher than the threshold Th_h, a determination is made that a reliability C of a position (latitude and longitude) with respect to the detected sign or marking is high. In this manner, by determining a reliability of a position with respect to the detected sign or marking, a position of the sign or the marking can be accurately obtained even when using images photographed by in-vehicle cameras of various vehicles. In other words, even when a movement speed or a photographing position differs for each mobile body mounted with an in-vehicle camera and, consequently, positions of a detected sign or a detected marking slightly vary, a correct position can be recognized.

(vii) Drawing Unit 17

Figure 11:
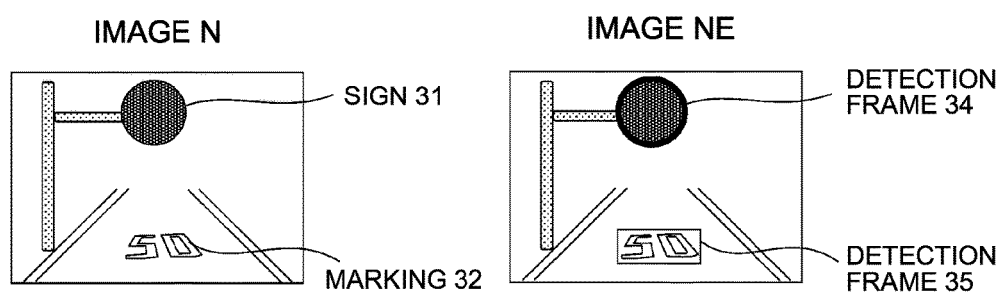
FIG. 11 is a diagram for illustrating an example of an operation by a drawing unit.

The drawing unit 17 draws determination results of a sign and a marking by the object detecting unit 14 onto an input image based on a determination result of reliability by the reliability determining unit 16. FIG. 11 is a diagram for illustrating an example of an operation by the drawing unit 17. In FIG. 11, a left-side image N represents an example of an input image expressed by an RGB color space in a similar manner to FIG. 3, and a right-side image NE represents an example of an image on which detection results of a sign and a marking have been drawn.

When the reliability determining unit 16 determines that the reliability C is high, as shown in FIG. 11, by drawing detection frames 34 and 35 on the input image N so as to enclose the sign 31 and the marking 32 detected by the object detecting unit 14, the image NE indicating detection results of these objects is created. On the other hand, when the detection frequency described earlier has not reached the threshold Th_h and the reliability determining unit 16 determines that the reliability C is low, the drawing unit 17 does not draw the detection frames 34 and 35 onto the input image N and therefore does not create the image NE.

(viii) Recording Unit 18

The recording unit 18 saves the image NE created by the drawing unit 17 by drawing the detection frames 34 and 35 onto the input image N in the image storage unit 90.

Processing Procedure of Image Processing Apparatus

Figure 12:
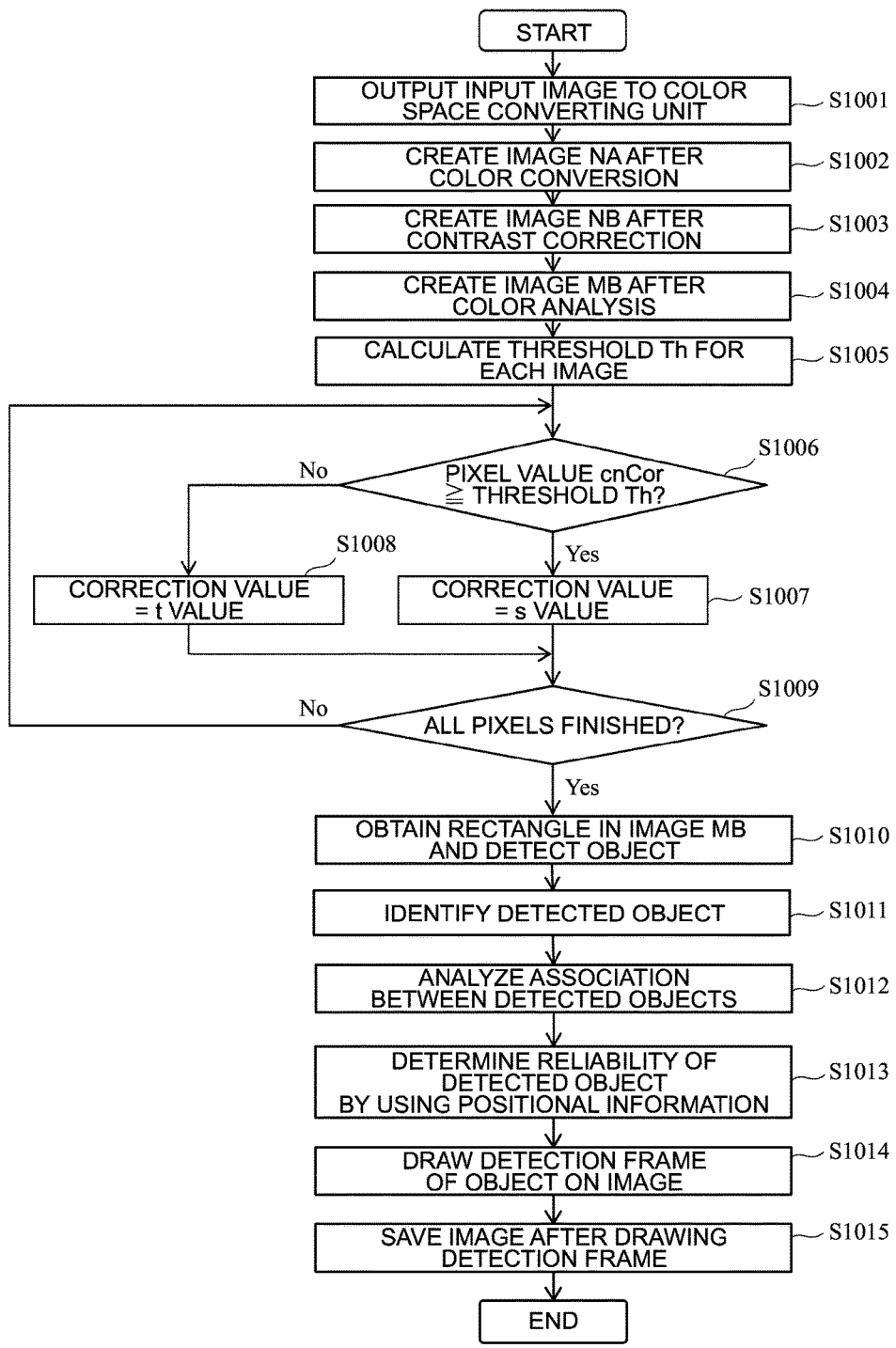
FIG. 12 is a flow chart for illustrating operations by an image processing apparatus according to the first embodiment of the present invention.

FIG. 12 is a flow chart for illustrating operations by the image processing apparatus 1 according to the first embodiment of the present invention.

(i) Step S1001

The input unit 10 accepts an image input from an in-vehicle camera and outputs the input image N to the color space converting unit 11.

(ii) Step S1002

The color space converting unit 11 obtains an image NA in which the input image N output from the input unit 10 is converted into a Lab color space image.

(iii) Step S1003

The contrast correcting unit 12 calculates an average value aveR2 of brightness of a color in a region R2 from the image NA obtained by the color space converting unit 11. In addition, the contrast correcting unit 12 reads an image (N−1)A following a temporally immediately-previous color space conversion from the image storage unit 90, and calculates an average value aveR1 of brightness of a color in a region R1. Subsequently, the contrast correcting unit 12 generates a contrast-corrected image NB using expressions (1) and (2) described earlier.

(iv) Step S1004

The color analyzing unit 13 obtains an absolute value s_R, s_G, or s_B of a color difference for each primary color of each pixel using expression (3) described earlier, and creates an image MB after color correction involving color masking by comparing these values with a threshold Th_s.

(v) Step S1005

The object detecting unit 14 obtains a threshold Th for each image using expressions (4) and (5) described earlier.

(vi) Step S1006

The object detecting unit 14 compares each pixel value cnCor of the contrast-corrected image NB with the threshold Th. As a result, when cnCor corresponds to the a value, the process makes a transition to step S1007 if cnCor threshold Th but the process makes a transition to step S1008 if cnCor<threshold Th. Meanwhile, when cnCor corresponds to the b value, the inequality signs in the determination in step S1006 are reversed with respect to FIG. 12. In other words, the process makes a transition to step S1007 if cnCor≤threshold Th but the process makes a transition to step S1008 if cnCor>threshold Th.

(vii) Step S1007

Regardless of whether each pixel value cnCor of the image NB corresponds to the a value or the b value, the object detecting unit 14 sets a correction value to an s value (for example, 255).

(viii) Step S1008

Regardless of whether each pixel value cnCor of the image NB corresponds to the a value or the b value, the object detecting unit 14 sets a correction value to a t value (for example, 0).

(ix) Step S1009

The object detecting unit 14 repeats the processes of steps S1006 to S1008 described above until a correction value is obtained for all pixels in a target image. By repeating the processes of steps S1006 to S1009, an image ND in which a background and an object are separated from the image NB is created and the sign 31 that is a detection target object is detected.

(x) Step S1010

The object detecting unit 14 obtains an object constituting a rectangle from a region R3 in the image MB. Accordingly, an image MC in which a background and an object are separated from the image MB is created and the marking 32 that is a detection target object is detected.

(xi) Step S1011

The object detecting unit 14 reads a reference image from the image storage unit 90, respectively creates a histogram with respect to an image of the detected object and the reference image, and calculates a similarity R between the histograms using expression (6) described earlier. In addition, the object detecting unit 14 determines a degree of similarity between the detected object and the reference image based on the calculated similarity R and, for example, determines that the degree of similarity is high when similarity R≤threshold Th_R and identifies the detected object as a sign or a marking. Moreover, since the similarity R is calculated as a Bhattacharyya distance, the smaller the value of the similarity R, the shorter the distance between the histograms and the higher the similarity. At this point, as described earlier, using an identifier obtained by machine learning using a neural network, a determination result by the identifier may be added to the determination described above to determine whether the detected object is a sign or a marking to be identified.

(xii) Step S1012

The object association analyzing unit 15 analyzes an association between objects detected by the object detecting unit 14. At this point, as described with reference to FIGS. 8A to 8E, the object association analyzing unit 15 respectively stores recognition rates of signs and markings detected in a plurality of input images that have been acquired time-sequentially, and determines final recognition results of a sign and a marking by calculating an average value of recognition rates stored in a certain period of time. Accordingly, a sign and a marking that are detection target objects are recognized based on a time series association between the sign and the marking.

(xiii) Step S1013

The reliability determining unit 16 accumulates positional information (latitude and longitude) at the time of photography of a detected object and, when an accumulated detection frequency is equal to or higher than a threshold Th_h, the reliability determining unit 16 determines that a reliability C of a position of the detected object is high. On the other hand, the reliability determining unit 16 determines that the reliability C is low when the detection frequency is lower than the threshold Th_h. The reliability determining unit 16 determines the reliability C for each object detected by the object detecting unit 14.

(xiv) Step S1014

When the reliability C is high, the drawing unit 17 draws the detection frames 34 and 35 on the input image N so as to enclose the objects detected by the object detecting unit 14 to create an image NE. On the other hand, when the reliability C is low, the drawing unit 17 does not draw the detection frames on the input image N.

(xv) Step S1015

The recording unit 18 saves the image NE in which the detection frames 34 and 35 have been drawn by the drawing unit 17 in the image storage unit 90.

As described above, according to the first embodiment of the present invention, using an average value aveR1 of brightness of a color based on a previous input image (N−1) and an average value aveR2 of brightness of a color based on a present input image N, an image NB is created in which contrast of the input image N is corrected, and a threshold Th for separating a sign and a background is obtained for each image NB to create an image ND. Therefore, using the threshold Th, a background and the sign that is a detection target object in the input image N can be separated.

In addition, with respect to the primary colors of R, G, and B, an absolute value s_R, s_G, or s_B of a color difference for each primary color of each pixel in the input image N is calculated to create a color-masked image MB, and an image MC is created by obtaining a rectangle in the image MB. Therefore, a background and the marking that is a detection target object in the input image N can be separated.

In addition, a reliability of an object is determined using detection results of the object detected in a plurality of images. Therefore, each object can be accurately recognized.

Furthermore, by accumulating positional information of a detected object and determining a detection frequency, positional information of each detected object can be more accurately obtained.

In addition, since objects are detected from the color-masked image MB and the contrast-enhanced image NB, even if a part of a sign or a marking in the images is cut off, the sign and the marking can be detected since objects are detected in accordance with the color and contrast of the objects appearing in the images.

As described above, by using brightness information in a previous image and a target image to create an image in which contrast of the target image is enhanced and obtaining a threshold for separating a region in an image for each image, even when brightness of an image in a video changes depending on a direction of travel of a moving vehicle, a background in the image and an object in the background can be separated and the object in the background can be detected. In addition, by detecting objects from images and using recognition results of objects respectively detected from a plurality of image that have been acquired time-sequentially together with accurate positional information, each object can be accurately recognized. Furthermore, by detecting objects from videos of in-vehicle smartphones photographed by many and unspecified users and obtaining more accurate positions from a detection frequency of positional information, road accessories and markings on roads which have been modified due to a newly laid road or road construction can be detected in a timely manner.

The first embodiment of the present invention described above produces the following operational advantages.

(1) An image processing apparatus 1 includes a contrast correcting unit 12, a color analyzing unit 13, an object detecting unit 14, and an object association analyzing unit 15. The contrast correcting unit 12 creates a contrast-corrected image NB in which contrast of an input image N photographed by an in-vehicle camera that is mounted to a vehicle is corrected. The color analyzing unit 13 creates a color-corrected image MB in which a color of the input image N is corrected. The object detecting unit 14 detects a sign included in the input image N based on the contrast-corrected image NB and detects a marking included in the input image N based on the color-corrected image MB. The object association analyzing unit 15 recognizes the sign and the marking that are target objects based on a time series association between the sign and the marking detected by the object detecting unit 14. By adopting this configuration, a sign and a marking that are target objects can be correctly recognized from an image photographed with a camera.

(2) The image processing apparatus 1 further includes a reliability determining unit 16. The reliability determining unit 16 acquires positions of a sign and a marking and, based on an accumulated result of acquired positions of the sign and the marking, determines a reliability C of the sign and the marking. By adopting this configuration, a determination can be made on whether or not detection results of a sign and a marking are correct.

(3) The contrast correcting unit 12 sets a target region R2 in a prescribed range of the input image N and, based on an average value aveR1 of brightness of a color in a region R1 corresponding to the target region R2 of a previous image (N−1) photographed before the input image N and an average value aveR2 of brightness of a color in the target region R2 of the input image N, creates the contrast-corrected image NB. By adopting this configuration, the contrast-corrected image NB appropriate for detecting a sign that is a target object can be created.

(4) The color analyzing unit 13 sets a target region R3 in a prescribed range of the input image N and, based on color difference values s_R, s_G, and s_B in the target region R3 of the input image N, creates the color-corrected image MB. By adopting this configuration, the color-corrected image MB appropriate for detecting a marking that is a target object can be created.

(5) The object detecting unit 14 respectively detects a sign and a marking that are target objects using a reference image set in advance. By adopting this configuration, a sign and a marking can be respectively detected with accuracy.

(6) When a condition is satisfied in that contents of a traffic regulation or an instruction indicated by a sign and contents of a traffic regulation or an instruction indicated by a marking are the same in a prescribed number or more of input images that have been acquired time-sequentially, the object association analyzing unit 15 recognizes the sign and the marking in association with each other. By adopting this configuration, a sign and a marking that correspond to each other can be accurately and reliably associated with each other.

(7) In addition, when a recognition rate of one of a sign and a marking satisfying the condition described above is equal to or higher than a prescribed first threshold such as 0.8 and a recognition rate of the other is lower than a prescribed second threshold such as 0.3 that is lower than the first threshold, the object association analyzing unit 15 can determine that the other sign or marking is degraded. Accordingly, when one of a sign and a marking that correspond to each other is degraded due to blurring or the like, the degraded sign or marking can be accurately determined.

Second Embodiment

Figure 13:
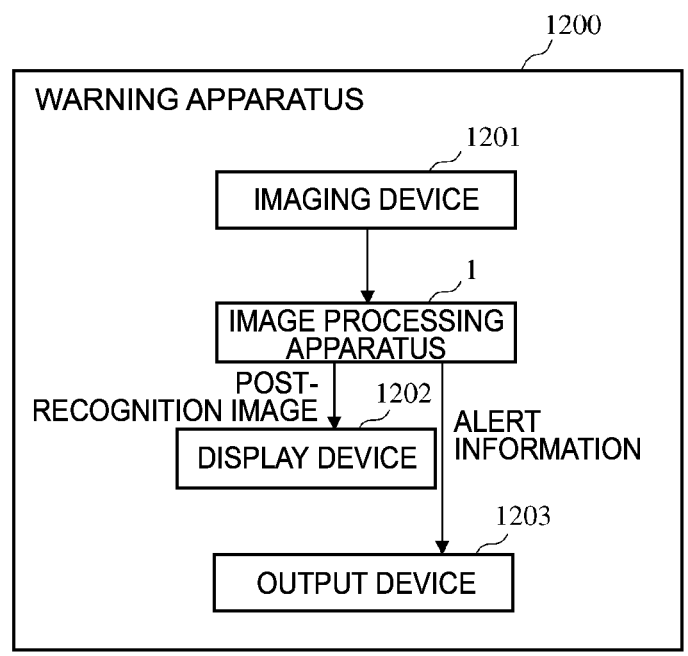
FIG. 13 is a block diagram showing a configuration of a warning apparatus according to a second embodiment of the present invention.

FIG. 13 is a block diagram showing a configuration of a warning apparatus 1200 according to a second embodiment of the present invention. The warning apparatus 1200 is used mounted to a vehicle and functions as, for example, a navigation system which displays a route on a map and guides a user to a destination. In addition, the warning apparatus 1200 gathers information on target objects such as signs and markings that are present around the vehicle in real time and outputs a warning (an alert) by screen display or voice when the vehicle approaches a prescribed warning location. For example, a warning location may be a predetermined location such as a general-purpose building like a city hall or a police station and a landmark-type building, or a location marked by a user during a previous travel of the vehicle. The warning apparatus 1200 according to the present embodiment provides the user with beneficial information while gathering information from the user.

The warning apparatus 1200 includes an imaging device 1201 which photographs image data, an image processing apparatus 1 which recognizes an image including a detection target from the image data, a display device 1202 which displays a post-recognition image output from the image processing apparatus 1, and an output device 1203 which outputs alert information output from the image processing apparatus 1. As the warning apparatus 1200, for example, an apparatus such as a smartphone can be used. The imaging device 1201 is constituted by a CMOS sensor, a CCD camera, or the like and corresponds to the in-vehicle camera described in the first embodiment. A configuration and operations of the image processing apparatus 1 are as described in the first embodiment.

As described in the first embodiment, the image processing apparatus 1 recognizes various signs and markings from images photographed by the imaging device 1201. In addition, a reference image corresponding to objects such as road accessories may be prepared in advance to be included as a recognition target.

The display device 1202 displays an image showing a recognition result of a sign, a marking, or the like output from the image processing apparatus 1 and corresponds to, for example, a display apparatus of a smartphone.

The output device 1203 outputs a warning based on alert information output from the image processing apparatus 1 in the form of an image or voice and corresponds to, for example, a display apparatus or a speaker of a smartphone.

The warning apparatus 1200 outputs alert information from the image processing apparatus 1 to the output device 1203 based on a recognition result of an object such as a sign and a marking by the object association analyzing unit 15 described earlier in the image processing apparatus 1. When alert information is output from the image processing apparatus 1, based on the alert information, the output device 1203 outputs a warning to the user who is a driver of the vehicle. For example, when contents of a detected object match map information, the user is notified of the map information. In addition, when contents of a detected object do not match map information in one detection, the user is not yet notified of alert information at that point. Furthermore, when an object could not be detected a plurality of times at a same point but map information includes information on the object, since there is a possibility that a sign or a marking at that point has been changed, the user is notified of a message prompting the user to check the sign or the marking. For example, message notification is performed by outputting a voice saying "Check sign (or marking)". Moreover, information on a sign and information on a marking may be notified in combination to the user or the information may be separately notified to the user. In addition, a photographed image, an image indicating a recognition result of an object, or the like at the point where an alert is issued may be registered in the warning apparatus 1200 together with information indicating the point.

According to the second embodiment of the present invention described above, a warning apparatus 1200 includes an image processing apparatus 1 and an output device 1203 as a warning output unit which outputs a warning to a driver of a vehicle based on a recognition result of a sign and a warning by an object association analyzing unit 15. Accordingly, the warning apparatus 1200 can be provided which recognizes a sign or a marking from an image photographed by a smartphone or the like mounted to a vehicle and which notifies a user of an image indicating a recognition result thereof together with alert information.

Third Embodiment

Figure 14:
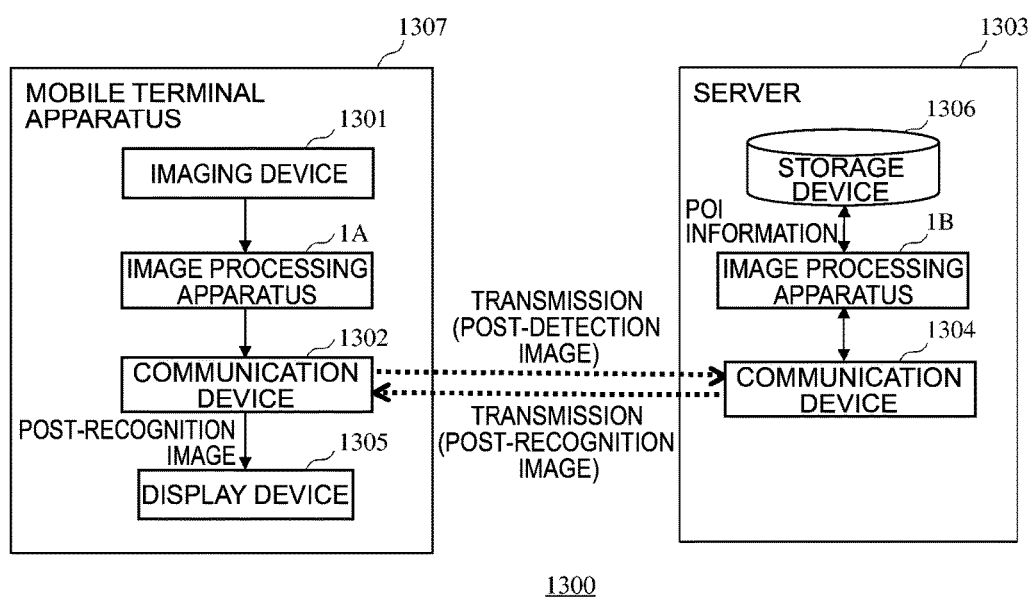
FIG. 14 is a block diagram showing a configuration of an image processing system according to a third embodiment of the present invention.

FIG. 14 is a block diagram showing a configuration of an image processing system 1300 according to a third embodiment of the present invention. The image processing system 1300 creates POI (Point of Interest) information based on an image photographed from a vehicle and includes a server 1303 and a mobile terminal apparatus 1307.

The mobile terminal apparatus 1307 includes an imaging device 1301 which photographs image data, an image processing apparatus 1A which detects an image including a detection target from the image data in a simplified manner, a communication device 1302 which transmits a post-detection image output from the image processing apparatus 1A to the server 1303 and which receives a post-recognition image transmitted from the server 1303, and a display device 1305 which displays the post-recognition image. As the mobile terminal apparatus 1307, for example, an apparatus such as a smartphone can be used in a similar manner to the warning apparatus 1200 described in the second embodiment. The imaging device 1301 is constituted by a CMOS sensor, a CCD camera, or the like and corresponds to the in-vehicle camera described in the first embodiment.

The image processing apparatus 1A includes the functional components from the input unit 10 to the object detecting unit 14 among the respective functional components of the image processing apparatus 1 described with reference to FIG. 1 in the first embodiment. In other words, as the image processing apparatus 1A, the mobile terminal apparatus 1307 includes the input unit 10, the color space converting unit 11, the contrast correcting unit 12, the color analyzing unit 13, and the object detecting unit 14. Using the object detecting unit 14, the image processing apparatus 1A detects a sign, a marking, and the like from an image photographed by the imaging device 1301 and outputs an image indicating detection results thereof to the communication device 1302 as a post-detection image. In addition, the image processing apparatus 1A may include objects such as road accessories and specific signs representing facility information, spot information, or the like in detection targets. Moreover, the post-detection image may be an entire photographed image or a partial image including a detected object. The communication device 1302 transmits a post-detection image with respect to these detection target objects output from the image processing apparatus 1A to the server 1303 and corresponds to the communication device 206 described with reference to FIG. 2 in the first embodiment.

The server 1303 includes a communication device 1304 which receives the post-detection image transmitted from the mobile terminal apparatus 1307 and which transmits the post-recognition image output from an image processing apparatus 1B to the mobile terminal apparatus 1307, the image processing apparatus 1B which recognizes a sign and a marking from the received post-detection image, and a storage device 1306 which stores POI information based on the post-recognition image output from the image processing apparatus 1B.

The image processing apparatus 1B shares the same functional components as the image processing apparatus 1 described with reference to FIG. 1 in the first embodiment. Using the input unit 10 to the object association analyzing unit 15, the image processing apparatus 1B recognizes objects such as a sign and a marking, road accessories, and specific signs from the post-detection image transmitted from the mobile terminal apparatus 1307. The storage device 1306 stores, as POI information, post-recognition images thereof in combination with positional information.

The communication device 1304 transmits a post-recognition image with respect to these recognition target objects output from the image processing apparatus 1B to the mobile terminal apparatus 1307 and corresponds to the communication device 206 described with reference to FIG. 2 in the first embodiment.

When the post-recognition image is transmitted from the server 1303, the communication device 1302 of the mobile terminal apparatus 1307 receives the post-recognition image and outputs the post-recognition image to the display device 1305. The display device 1305 displays the post-recognition image transmitted from the server 1303 and corresponds to, for example, a display apparatus of a smartphone. At this point, for example, the display device 1305 may display a map screen and issue a notification regarding a recognized sign, marking, or the like to a user who is a driver of a vehicle by displaying a mark indicating the presence of a target object included in the post-recognition image at a corresponding position on the map screen.

According to the third embodiment of the present invention described above, an image processing system 1300 includes a mobile terminal apparatus 1307 mounted to a vehicle and a server 1303 which communicates with the mobile terminal apparatus 1307. The mobile terminal apparatus 1307 includes a contrast correcting unit 12, a color analyzing unit 13, and an object detecting unit 14 as an image processing apparatus 1A and a communication device 1302 as an image transmitting unit which transmits a post-detection image indicating detection results of a sign and a marking by the object detecting unit 14 to the server 1303. The server 1303 includes a communication device 1304 as an image receiving unit which receives the post-detection image transmitted from the mobile terminal apparatus 1307, and an image processing apparatus 1B includes components which are similar to those of the image processing apparatus 1 described with reference to FIG. 1 and which recognize a sign and a marking using the received post-detection image. Accordingly, a system can be provided which recognizes a sign, a marking, a specific sign, and the like from an image photographed by a smartphone or the like mounted to a vehicle and which stores, as POI information, a post-recognition image thereof together in combination with positional information.

In the image processing system 1300, the communication device 1304 of the server 1303 also functions as a second image transmitting unit which transmits a post-recognition image related to a sign and a marking recognized by the image processing apparatus 1B to the mobile terminal apparatus 1307. In addition, the communication device 1302 of the mobile terminal apparatus 1307 also functions as a second image receiving unit which receives the post-recognition image transmitted from the server 1303. Furthermore, the mobile terminal apparatus 1307 includes a display device 1305 as a notifying unit which issues a notification regarding a sign and a marking to a driver of the vehicle based on the post-recognition image received by the communication device 1302. Accordingly, the driver can be notified of beneficial information when driving the vehicle.

Fourth Embodiment

Figure 15:
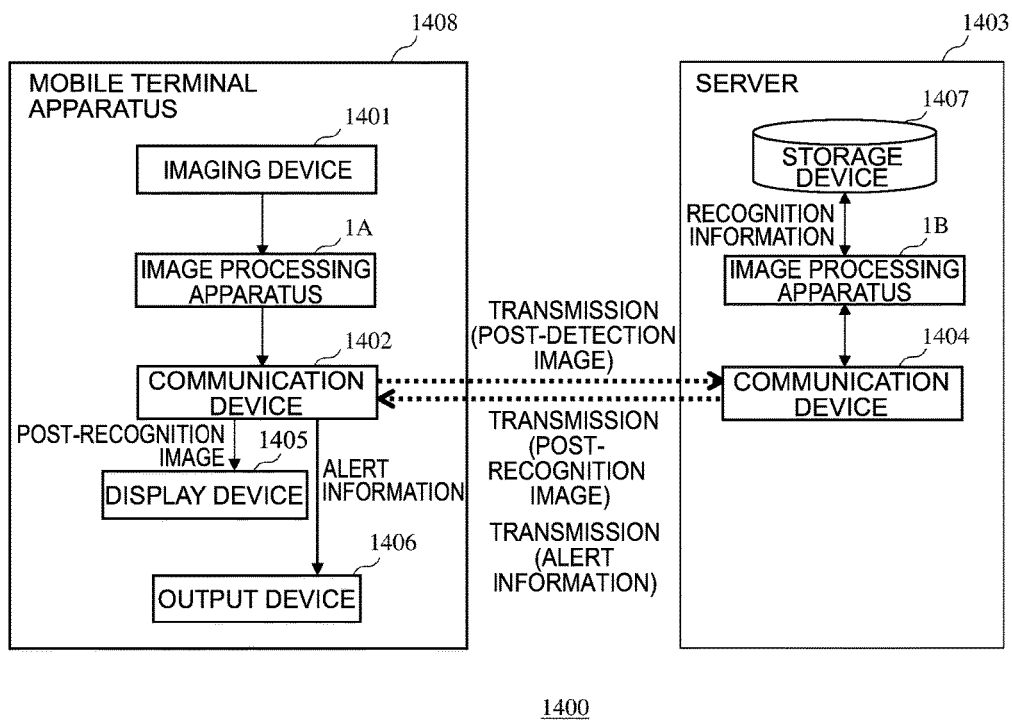
FIG. 15 is a block diagram showing a configuration of an image processing system according to a fourth embodiment of the present invention.

FIG. 15 is a block diagram showing a configuration of an image processing system 1400 according to a fourth embodiment of the present invention. The image processing system 1400 outputs a warning to a driver of a vehicle based on an image photographed from the vehicle and includes a server 1403 and a mobile terminal apparatus 1408.

The image processing system 1400 functions as, for example, a navigation system which displays a route on a map and guides a user to a destination in a similar manner to the warning apparatus 1200 described in the second embodiment. In addition, the image processing system 1400 gathers information on target objects such as signs and markings present around the vehicle in real time and outputs a warning (an alert) by screen display or voice when the vehicle approaches a prescribed warning location. For example, a warning location may be a predetermined location such as a general-purpose building like a city hall or a police station and a landmark-type building, or a location marked by a user during a previous travel of the vehicle. The image processing system 1400 according to the present embodiment provides the user with beneficial information while gathering information from the user.

The mobile terminal apparatus 1408 includes an imaging device 1401 which photographs image data, an image processing apparatus 1A which detects an image including a detection target from the image data in a simplified manner, a communication device 1402 which transmits a post-detection image output from the image processing apparatus 1A to the server 1403 and which receives a post-recognition image and alert information transmitted from the server 1403, a display device 1405 which displays the post-recognition image, and an output device 1406 which outputs the alert information. As the mobile terminal apparatus 1408, for example, an apparatus such as a smartphone can be used in a similar manner to the mobile terminal apparatus 1307 described in the third embodiment. The imaging device 1401 is constituted by a CMOS sensor, a CCD camera, or the like and corresponds to the in-vehicle camera described in the first embodiment.

A configuration and operations of the image processing apparatus 1A are as described in the third embodiment. The communication device 1402 corresponds to the communication device 206 described with reference to FIG. 2 in the first embodiment.

The server 1403 includes a communication device 1404 which receives the post-detection image transmitted from the mobile terminal apparatus 1408 and which transmits the post-recognition image and alert information output from an image processing apparatus 1B to the mobile terminal apparatus 1408, the image processing apparatus 1B which recognizes a sign or a marking from the received post-detection image, and a storage device 1407 which stores recognition information based on the post-recognition image output from the image processing apparatus 1B.

A configuration and operations of the image processing apparatus 1B are as described in the third embodiment. The server 1403 outputs a post-recognition image and alert information from the image processing apparatus 1B to the communication device 1404 based on a recognition result of an object such as a sign and a marking by the image processing apparatus 1B. The storage device 1407 stores, as recognition information, post-recognition images obtained by the image processing apparatus 1B by recognizing road accessories such as signs and markings in combination with positional information. The communication device 1404 transmits a post-recognition image and alert information with respect to the recognition target objects output from the image processing apparatus 1B to the mobile terminal apparatus 1408 and corresponds to the communication device 206 described with reference to FIG. 2 in the first embodiment.

When the post-recognition image and the alert information are transmitted from the server 1403, the communication device 1402 of the mobile terminal apparatus 1408 receives the post-recognition image and the alert information and outputs the post-recognition image and the alert information to the display device 1405 and the output device 1406. The display device 1405 displays the post-recognition image transmitted from the server 1403 to notify the user of the post-recognition image in a similar manner to the display device 1305 described in the third embodiment and corresponds to, for example, a display apparatus of a smartphone.

The output device 1406 outputs a warning based on the alert information output from the server 1403 in the form of an image or voice and corresponds to, for example, a display apparatus or a speaker of a smartphone. Moreover, a photographed image, an image indicating a recognition result of an object, or the like at the point where an alert is issued may be registered in the server 1403 and the mobile terminal apparatus 1408 together with information indicating the point.

According to the fourth embodiment of the present invention described above, an image processing system 1400 includes a mobile terminal apparatus 1408 mounted to a vehicle and a server 1403 which communicates with the mobile terminal apparatus 1408 in a similar manner to the image processing system 1300 according to the third embodiment. The mobile terminal apparatus 1408 includes a contrast correcting unit 12, a color analyzing unit 13, and an object detecting unit 14 as an image processing apparatus 1A and a communication device 1402 as an image transmitting unit which transmits a post-detection image indicating detection results of a sign and a marking by the object detecting unit 14 to the server 1403. The server 1403 includes a communication device 1404 as an image receiving unit which receives the post-detection image transmitted from the mobile terminal apparatus 1408, and an image processing apparatus 1B includes components which are similar to those of the image processing apparatus 1 described with reference to FIG. 1 and which recognize a sign and a marking using the received post-detection image. In addition, in the image processing system 1400, the communication device 1404 of the server 1403 also functions as a warning information transmitting unit which transmits warning information (alert information) based on a recognition result of a sign and a marking by the image processing apparatus 1B to the mobile terminal apparatus 1408. Furthermore, the communication device 1402 of the mobile terminal apparatus 1408 also functions as a warning information receiving unit which receives the warning information (alert information) transmitted from the server 1403. Moreover, the mobile terminal apparatus 1408 includes an output device 1406 as a warning output unit which outputs a warning to a driver of a vehicle based on the warning information (alert information) received by the communication device 1402. Accordingly, a system can be provided which recognizes a sign or a marking from an image photographed by a smartphone or the like mounted to a vehicle and which issues a warning based on a recognition result thereof to a user.

Fifth Embodiment

Figure 16:
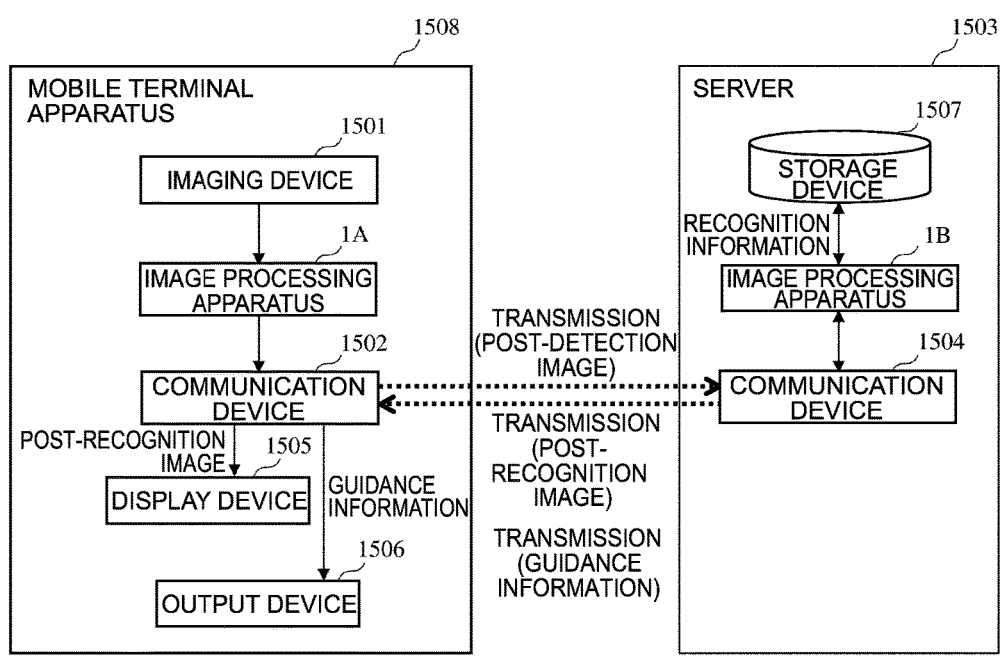
FIG. 16 is a block diagram showing a configuration of an image processing system according to a fifth embodiment of the present invention.

FIG. 16 is a block diagram showing a configuration of an image processing system 1500 according to a fifth embodiment of the present invention. For example, when a travel route is set by a user, the image processing system 1500 gathers information on target objects such as signs and markings present around a vehicle in real time and provides the information to the user, and guides the vehicle along the travel route to a destination. In doing so, instead of providing vehicle guidance by displaying a route on a map as is the case with the warning apparatus 1200 described in the second embodiment, in the present embodiment, when a sign or a marking related to vehicle guidance is recognized on a set route, the vehicle is guided based on a recognition result of the sign or the marking. For example, when a sign or a marking indicating a left turn is recognized at a point where a left turn should be made, vehicle guidance is provided by a method such as outputting a voice saying "Turn left here". The image processing system 1500 includes a server 1503 and a mobile terminal apparatus 1508.

The mobile terminal apparatus 1508 includes an imaging device 1501 which photographs image data, an image processing apparatus 1A which detects an image including a detection target from the image data in a simplified manner, a communication device 1502 which transmits a post-detection image output from the image processing apparatus 1A to the server 1503 and which receives a post-recognition image and guidance information transmitted from the server 1503, a display device 1505 which displays the post-recognition image, and an output device 1506 which outputs the guidance information. As the mobile terminal apparatus 1508, for example, an apparatus such as a smartphone can be used in a similar manner to the mobile terminal apparatus 1307 described in the third embodiment or the mobile terminal apparatus 1408 described in the fourth embodiment. The imaging device 1501 is constituted by a CMOS sensor, a CCD camera, or the like and corresponds to the in-vehicle camera described in the first embodiment.

A configuration and operations of the image processing apparatus 1A are as described in the third embodiment. The communication device 1502 corresponds to the communication device 206 described with reference to FIG. 2 in the first embodiment.

The server 1503 includes a communication device 1504 which receives the post-detection image transmitted from the mobile terminal apparatus 1508 and which transmits the post-recognition image and guidance information output from an image processing apparatus 1B to the mobile terminal apparatus 1508, the image processing apparatus 1B which recognizes a sign, a marking, or a destination sign from the received post-detection image, and a storage device 1507 which stores recognition information based on the post-recognition image output from the image processing apparatus 1B.

A configuration and operations of the image processing apparatus 1B are as described in the third embodiment. The server 1503 outputs a post-recognition image and guidance information from the image processing apparatus 1B to the communication device 1504 based on a recognition result of an object such as a sign, a marking, and a destination sign by the image processing apparatus 1B. For example, the server 1503 identifies whether or not a destination sign is related to a travel direction of the vehicle, identifies a guidance direction from an arrow or characters used in the destination sign according to pattern matching of the arrow or characters, and outputs guidance information. The storage device 1507 stores, as recognition information, post-recognition images obtained by the image processing apparatus 1B by recognizing road accessories such as signs and markings in combination with positional information. The communication device 1504 transmits a post-recognition image and guidance information with respect to the recognition target objects output from the image processing apparatus 1B to the mobile terminal apparatus 1508 and corresponds to the communication device 206 described with reference to FIG. 2 in the first embodiment.

When the post-recognition image and the guidance information are transmitted from the server 1503, the communication device 1502 of the mobile terminal apparatus 1508 receives the post-recognition image and the guidance information and outputs the post-recognition image and the guidance information to the display device 1505 and the output device 1506. The display device 1505 displays the post-recognition image transmitted from the server 1503 to notify the user of the post-recognition image in a similar manner to the display device 1305 described in the third embodiment and corresponds to, for example, a display apparatus of a smartphone.

Based on the guidance information transmitted from the server 1503, the output device 1506 guides the vehicle to a destination by, for example, instructing the user as to which way to turn the vehicle through an image or voice. The output device 1506 corresponds to, for example, a display apparatus or a speaker of a smartphone.

According to the fifth embodiment of the present invention described above, an image processing system 1500 includes a mobile terminal apparatus 1508 mounted to a vehicle and a server 1503 which communicates with the mobile terminal apparatus 1508 in a similar manner to the image processing system 1300 according to the third embodiment. The mobile terminal apparatus 1508 includes a contrast correcting unit 12, a color analyzing unit 13, and an object detecting unit 14 as an image processing apparatus 1A and a communication device 1502 as an image transmitting unit which transmits a post-detection image indicating detection results of a sign and a marking by the object detecting unit 14 to the server 1503. The server 1503 includes a communication device 1504 as an image receiving unit which receives the post-detection image transmitted from the mobile terminal apparatus 1508, and an image processing apparatus 1B includes components which are similar to those of the image processing apparatus 1 described with reference to FIG. 1 and which recognize a sign and a marking using the received post-detection image. In addition, in the image processing system 1500, the communication device 1504 of the server 1503 also functions as a guidance information transmitting unit which transmits guidance information for guiding the vehicle to a prescribed destination based on a recognition result of a sign and a marking by the image processing apparatus 1B to the mobile terminal apparatus 1508. Furthermore, the communication device 1502 of the mobile terminal apparatus 1508 also functions as a guidance information receiving unit which receives the guidance information transmitted from the server 1503. Moreover, the mobile terminal apparatus 1508 includes an output device 1506 as a vehicle guiding unit which guides the vehicle to a destination based on the guidance information received by the communication device 1502. Accordingly, a system can be provided which recognizes a sign or a marking from an image photographed by a smartphone or the like mounted to a vehicle and which guides the vehicle based on a recognition result thereof in a simplified manner.

The respective embodiments described above can be modified as follows.

While the color space converting unit 11 creates an image in which an input image is converted into a Lab color space, the input image may be converted into an image of another color space such as an HSV color space. Even in such cases, similar effects to the embodiments described above are produced.

While the object detecting unit 14 determines a similarity between a reference image and an image of a detected object using expression (6), the similarity may be determined using any one of B32(r), B32(g), and B32(b) or respective combinations thereof. Even in such cases, similar effects to the embodiments described above are produced.

While the object detecting unit 14 respectively detects and recognizes a sign installed near a road and a marking drawn on a road surface as target objects and the object association analyzing unit 15 recognizes the target objects by analyzing an association between the target objects, other objects may be used as target objects. Even in such cases, similar effects to the embodiments described above are produced.

The present invention can also be realized by a program code of software that realizes the functions of the embodiments. In this case, a system or an apparatus is provided with a storage medium on which the program code is recorded, and a computer (a CPU, an MPU, or the like) mounted to the system or the apparatus reads the program code stored in the storage medium. In this case, the functions of the embodiments described above are to be realized as the computer executes the program code read from the storage medium, in which case the program code, the storage medium storing the program code, the computer executing the program code, and the like are to constitute components of the present invention. As the storage medium for supplying such a program code, for example, a flexible disk, a CD-ROM, a DVD-ROM, a hard disk, an optical disk, a magneto-optical disk, a CD-R, a magnetic tape, a nonvolatile memory card, and a ROM are used.

It is to be understood that the embodiments and the various modifications described above are merely examples and that the present invention is not limited to contents thereof as long as features of the invention are not adversely affected. The present invention is by no means limited to the embodiments and the modifications described above and various changes may be made without departing from the spirit of the invention.

What is claimed is:

1. An image processing system, comprising:
   a terminal apparatus mounted to a vehicle; and
   a server apparatus which communicates with the terminal apparatus, wherein
   the terminal apparatus is programmed to:
      create a contrast-corrected image in which contrast of an input image photographed by an in-vehicle camera that is mounted to a vehicle is corrected;
      create a color-corrected image in which a color of the input image is corrected;
      detect a first target object included in the input image based on the contrast-corrected image, and detect a second target object included in the input image based on the color-corrected image; and
      transmit to the server apparatus, a post-detection image showing a detection result of the first target object and the second target object, and
   the server apparatus is programmed to:
      receive the post-detection image transmitted from the terminal apparatus;
      create a contrast-corrected image in which contrast of the post-detection image received by the server apparatus is corrected;
      create a color-corrected image in which a color of the post-detection image received by the server apparatus is corrected;
      detect a first target object included in the post-detection image based on the contrast-corrected image, and detect a second target object included in the post-detection image based on the color-corrected image; and
      recognize the first target object and the second target object based on a time series association between the first target object and the second target object in the post-detection image received by the server apparatus.

2. The image processing system according to claim 1, wherein
   the server apparatus is further programmed to:
      transmit, to the terminal apparatus, a post-recognition image regarding the first target object and the second target object recognized by the server apparatus, and
   the terminal apparatus is further programmed to:
      receive the post-recognition image transmitted from the server apparatus; and
      issue, to a driver of the vehicle, a notification regarding the first target object and the second target object, based on the post-recognition image received by the server apparatus.

3. The image processing system according to claim 1, wherein
   the server apparatus is further programmed to:
      transmit, to the terminal apparatus, warning information based on a recognition result of the first target object and the second target object, and
   the terminal apparatus is further programmed to:
      receive the warning information transmitted from the server apparatus; and
      output a warning to the driver of the vehicle, based on the warning information received by the terminal apparatus.

4. The image processing system according to claim 1, wherein
   the server apparatus is further programmed to:
      transmit, to the terminal apparatus, guidance information for guiding the vehicle to a prescribed destination, based on the recognition result of the first target object and the second target object by the server apparatus, and
   the terminal apparatus is further programmed to:
      receive the guidance information transmitted from the server apparatus; and
      guide the vehicle to the destination, based on the guidance information received by the terminal apparatus.

5. An image processing method for an input image which is photographed by an in-vehicle camera that is mounted to a vehicle, the image processing method comprising:
   creating, by the in-vehicle camera, a contrast-corrected image in which contrast of the input image is corrected;
   creating, by the in-vehicle camera, a color-corrected image in which a color of the input image is corrected;
   detecting, by the in-vehicle camera, a first target object included in the input image based on the contrast-corrected image;

detecting, by the in-vehicle camera, a second target object included in the input image based on the color-corrected image;

transmit, by the in-vehicle camera to a server apparatus, a post-detection image showing a detection result of the first target object and the second target object by the in-vehicle camera;

creating, by the server apparatus, a contrast-corrected image in which contrast of the post-detection image received by the server apparatus is corrected;

creating, by the server apparatus, a color-corrected image in which a color of the post-detection image received by the server apparatus is corrected;

detecting, by the server apparatus, a first target object included in the post-detection image based on the contrast-corrected image, and which detects detect a second target object included in the post-detection image based on the color-corrected image; and recognizing, by the server apparatus, the first target object and the second target object based on a time series association between the first target object and the second target object received by the server apparatus.

6. The image processing system according to claim 1, wherein:

the server apparatus is programmed to determine a target recognition result from recognition results of detected target objects in accordance with a type of a detected sign or a detected marking, and recognizes the target object.

7. The image processing method according to claim 5, further comprising:

transmitting, from the server apparatus to the in-vehicle camera, a post-recognition image regarding the first target object and the second target object recognized by the server apparatus;

receiving, by the in-vehicle camera, the post-recognition image transmitted from the server apparatus; and issuing, by the in-vehicle camera, to a driver of the vehicle, a notification regarding the first target object and the second target object, based on the post-recognition image received by the server apparatus.

8. The image processing method according to claim 5, further comprising:

transmitting, from the server apparatus to the in-vehicle camera, warning information based on a recognition result of the first target object and the second target object;

receiving, by the in-vehicle camera, the warning information transmitted from the server apparatus; and outputting, by the in-vehicle camera, a warning to the driver of the vehicle, based on the warning information received by the in-vehicle camera.

9. The image processing method according to claim 5, further comprising:

transmitting, from the server apparatus to the in-vehicle camera, guidance information for guiding the vehicle to a prescribed destination, based on the recognition result of the first target object and the second target object by the server apparatus;

receiving, by the in-vehicle camera, the guidance information transmitted from the server apparatus; and guiding, by the in-vehicle camera, the vehicle to the destination, based on the guidance information received by the terminal apparatus.

10. The image processing method according to claim 5, further comprising:

acquiring, by the in-vehicle camera, positions of the first target object and the second target object and determine, based on an accumulated result of the acquired positions of the first target object and the second target object, a reliability of the first target object and the second target object.

11. The image processing method according to claim 5, further comprising:

setting, by the in-vehicle camera, a target region in a prescribed range of the input image, and create the contrast-corrected image based on an average value of brightness of a color in a region corresponding to the target region of a previous image photographed before the input image and an average value of brightness of a color in the target region of the input image.

12. The image processing method according to claim 5, further comprising:

setting, by the in-vehicle camera, a target region in a prescribed range of the input image, and create the color-corrected image based on a color difference value in the target region of the input image.

13. The image processing method according to claim 5, further comprising:

respectively detecting, by the in-vehicle camera, the first target object and the second target object using a reference image set in advance.

14. The image processing method according to claim 5, wherein the first target object is a sign installed near a road and the second target object is a marking drawn on a road surface, the method further comprising:

recognizing, by the in-vehicle camera, the sign and the marking in association with each other when a condition is satisfied in that contents of a traffic regulation or an instruction indicated by the sign and contents of a traffic regulation or an instruction indicated by the marking are the same in a prescribed number or more of input images that have been acquired time-sequentially; and when a recognition rate of one of the sign and the marking satisfying the condition is equal to or higher than a prescribed first threshold and a recognition rate of the other is lower than a prescribed second threshold that is lower than the first threshold but equal to or higher than a prescribed third threshold that is lower than the second threshold, determining, by the server apparatus, that the other sign or the other marking is degraded.

15. The image processing system according to claim 1, wherein the terminal apparatus is further programmed to:

acquire positions of the first target object and the second target object and determine, based on an accumulated result of the acquired positions of the first target object and the second target object, a reliability of the first target object and the second target object.

16. The image processing system according to claim 1, wherein the terminal apparatus is programmed to:

set a target region in a prescribed range of the input image, and create the contrast-corrected image based on an average value of brightness of a color in a region corresponding to the target region of a previous image photographed before the input image and an average value of brightness of a color in the target region of the input image.

17. The image processing system according to claim 1, wherein the terminal apparatus is programmed to:

set a target region in a prescribed range of the input image, and create the color-corrected image based on a color difference value in the target region of the input image.

18. The image processing system according to claim 1, wherein the terminal apparatus is programmed to:
   respectively detect the first target object and the second target object using a reference image set in advance.

19. The image processing apparatus according to claim 1, wherein:
   the first target object is a sign installed near a road;
   the second target object is a marking drawn on a road surface; and
   the server apparatus is programmed to recognize the sign and the marking in association with each other when a condition is satisfied in that contents of a traffic regulation or an instruction indicated by the sign and contents of a traffic regulation or an instruction indicated by the marking are the same in a prescribed number or more of input images that have been acquired time-sequentially.

20. The image processing system according to claim 19, wherein:
   when a recognition rate of one of the sign and the marking satisfying the condition is equal to or higher than a prescribed first threshold and a recognition rate of the other is lower than a prescribed second threshold that is lower than the first threshold but equal to or higher than a prescribed third threshold that is lower than the second threshold, the server apparatus is programmed to determine that the other sign or the other marking is degraded.

* * * * *